United States Patent
Norieda et al.

(10) Patent No.: US 9,958,902 B2
(45) Date of Patent: *May 1, 2018

(54) INPUT DEVICE, INPUT METHOD, AND PROGRAM

(75) Inventors: Shin Norieda, Tokyo (JP); Hideo Mitsuhashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 25 days.

This patent is subject to a terminal disclaimer.

(21) Appl. No.: 13/635,088

(22) PCT Filed: Mar. 14, 2011

(86) PCT No.: PCT/JP2011/055876
§ 371 (c)(1),
(2), (4) Date: Sep. 14, 2012

(87) PCT Pub. No.: WO2011/115027
PCT Pub. Date: Sep. 22, 2011

(65) Prior Publication Data
US 2013/0009870 A1    Jan. 10, 2013

(30) Foreign Application Priority Data

Mar. 15, 2010   (JP) .................................. 2010-057941
Dec. 15, 2010   (JP) .................................. 2010-279666

(51) Int. Cl.
G08B 23/00     (2006.01)
G06F 1/16      (2006.01)
G06F 3/01      (2006.01)

(52) U.S. Cl.
CPC .............. G06F 1/163 (2013.01); G06F 3/011 (2013.01)

(58) Field of Classification Search
CPC .. G09G 5/00; G09G 5/02; G01C 9/00; H03M 11/00; G06F 1/163; G04C 3/002
USPC .................. 345/150, 156; 600/301; 700/245; 702/150; 341/22; 340/573.1; 704/258
See application file for complete search history.

(56) References Cited

U.S. PATENT DOCUMENTS 6,133,904 A  * 10/2000 Tzirkel-Hancock .......... 345/589
6,380,923 B1 *  4/2002 Fukumoto et al. ........... 345/156
2001/0040550 A1* 11/2001 Vance et al. .................. 345/156
2004/0243342 A1* 12/2004 Rekimoto ..................... 702/150

(Continued)

FOREIGN PATENT DOCUMENTS

CN          1996205 A       7/2007
JP       10-051527 A        2/1998

(Continued)

OTHER PUBLICATIONS

Lisa Zyga, Skinput turns your arm into a touchscreen (w/Video), SHYSORG.com Science:Physics:Tech:Nano:News, PhysOrg.com, Mar. 1, 2010, [online], <URL:http://www.physorg.com/news186681149.html>.

(Continued)

*Primary Examiner* — Abdul-Samad A Adediran
(74) *Attorney, Agent, or Firm* — Sughrue Mion, PLLC

(57) ABSTRACT

An input device comprises: a detection unit that detects a body movement generated by tapping a user body as detection data; and an input information determination unit that refers to the detection data, determines a tap position based on a fact that the detection data varies depending on the tap position, and outputs an operation command associated with the determined tap position.

19 Claims, 20 Drawing Sheets

(56) References Cited

U.S. PATENT DOCUMENTS

| | | | | |
|---|---|---|---|---|
| 2009/0146848 A1* | 6/2009 | Ghassabian | | 341/22 |
| 2009/0164219 A1* | 6/2009 | Yeung | | G04C 3/002 |
| | | | | 704/258 |
| 2011/0133934 A1* | 6/2011 | Tan | | G06F 1/163 |
| | | | | 340/573.1 |

FOREIGN PATENT DOCUMENTS

| | | |
|---|---|---|
| JP | 10-200610 A | 7/1998 |
| JP | 11-338597 A | 12/1999 |
| JP | 2002-358149 A | 12/2002 |
| WO | 2010024029 A1 | 3/2010 |

OTHER PUBLICATIONS

Communication dated Nov. 2, 2014 from the State Intellectual Property Office of the People's Republic of China in counterpart application No. 201180010104.5.
Communication dated Jun. 9, 2015, issued by the Japanese Patent Office in counterpart Japanese application No. 2012-505652.
Teppei Konishi, Palm top display with wearable projector, Transactions of the Virtual Reality Society of Japan, 13th Annual Conference VRSJ2008 Nara, VRSJ2008 Nara, Japan, the Virtual Reality Society of Japan, Sep. 24, 2008, 7 total pages.
Taro Matsumura, Between digital analog, Mac People, Japan, Ascii Media Works Corporation, Jun. 1, 2009, vol. 15, No. 6, Issue 244, 5 total pages.
Communication dated Mar. 8, 2016, from the Japanese Patent Office in counterpart application No. 2012-505652.

* cited by examiner

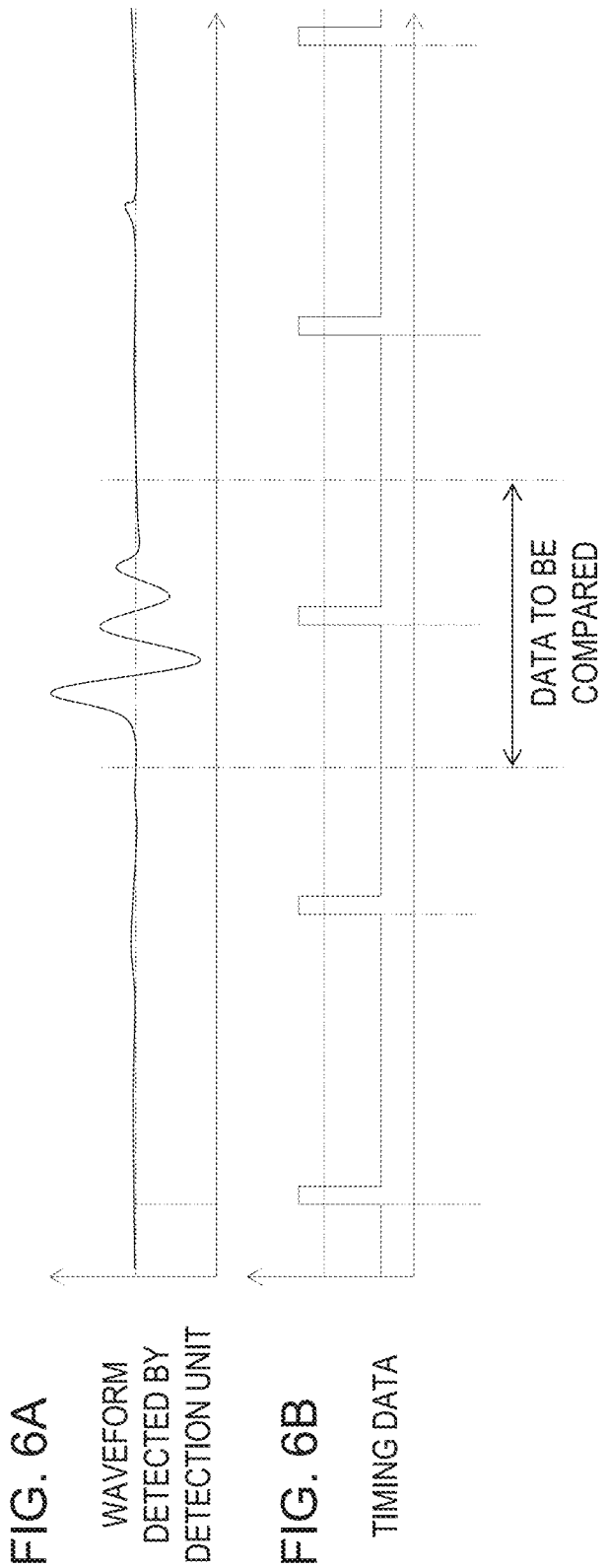

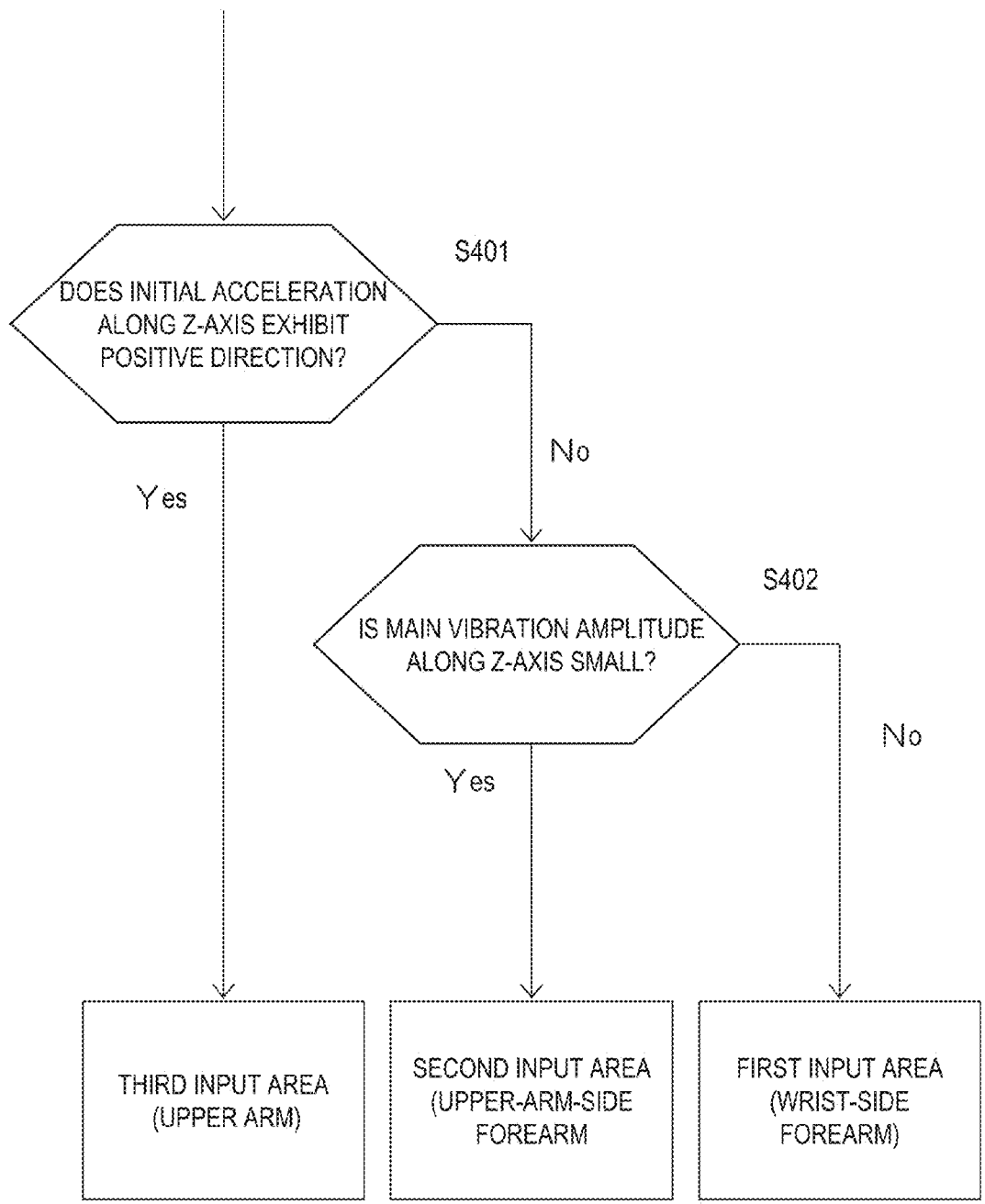

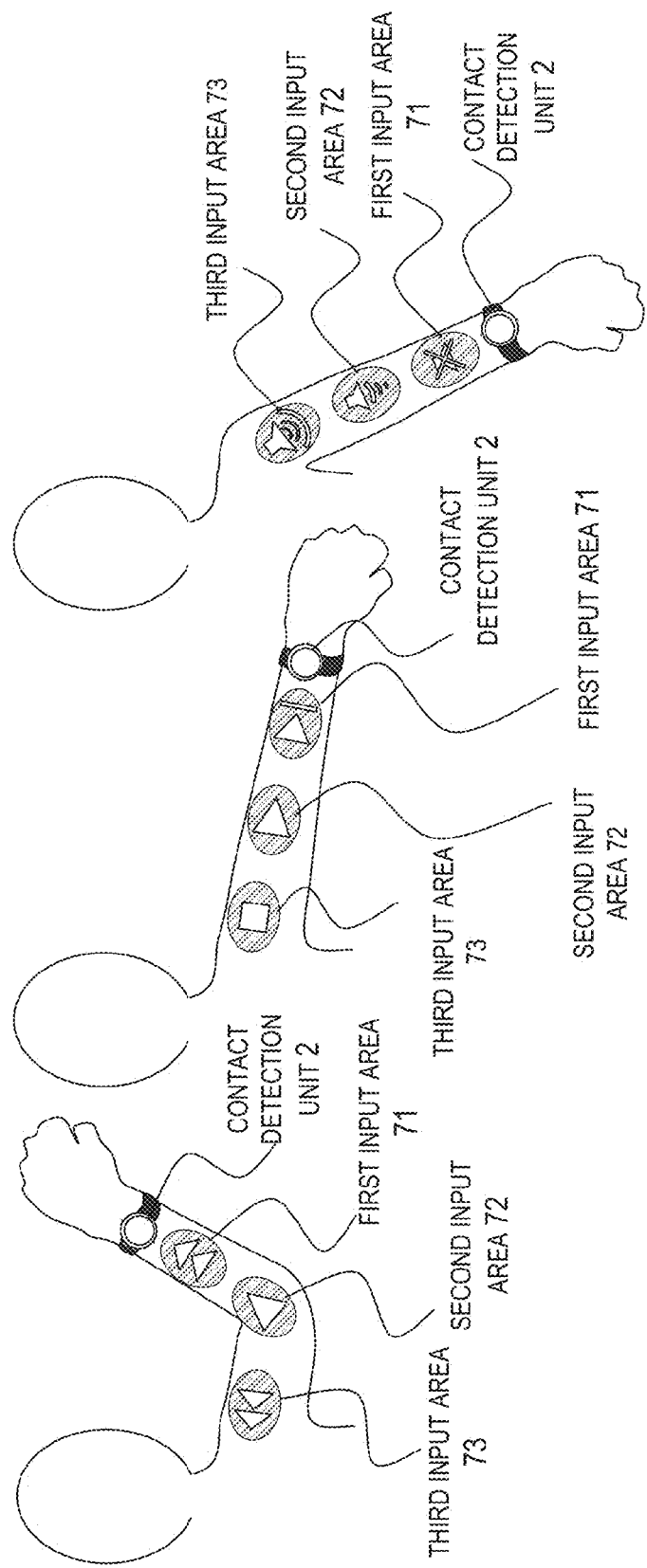

INPUT DEVICE, INPUT METHOD, AND PROGRAM

CROSS REFERENCE TO RELATED APPLICATIONS

This application is a National Stage of International Application No. PCT/JP2011/055876 filed Mar. 14, 2011, claiming priority based on Japanese Patent Application Nos. 2010-057941, filed Mar. 15, 2010 and 2010-279666 filed Dec. 15, 2010, the contents of all of which are incorporated herein by reference in their entirety.

TECHNICAL FIELD

Reference to Related Application

The present invention is based upon and claims the benefit of the priority of Japanese patent applications No. 2010-057941, filed on Mar. 15, 2010 and No. 2010-279666, filed on Dec. 15, 2010, the disclosures of which are incorporated herein in their entirety by reference thereto.

The present invention relates to an input device, an input method, and a program. In particular, it relates to an input device, an input method, and a program in a recorded medium applicable to a portable electronic device such as a portable music player or a mobile phone.

BACKGROUND

When a user executes an input operation for adjusting the volume, selecting a song, or the like on a small portable electronic device such as a portable music player, the user needs to extract the device from a pocket, a bag, or the like storing the device. As a technique to avoid this action, Patent Literature 1 describes a mobile phone device. According to Patent Literature 1, some of the mobile phone functions are attached to a portion on an arm of the user.

In addition, Patent Literature 2 discloses a phone device that is attached to a portion on an ear of the user and that realizes phone functions based on trigger signals generated when teeth of the user are clicked.

In addition, Patent Literature 3 describes an input device configured in the shape of a wristwatch. The input device receives gestures, such as gripping, releasing, twisting, and shaking, as commands.
Patent Literature 1:
Japanese Patent Kokai Publication No. JP-H10-051527A
Patent Literature 2:
Japanese Patent Kokai Publication No. JP-H10-200610A
Patent Literature 3:
Japanese Patent Kokai Publication No. JP2002-358149A

SUMMARY

The entire disclosures of the above Patent Literatures are incorporated herein by reference thereto. The following analyses are made by the present inventor.

Based on the mobile phone device described in Patent Literature 1, input keys are arranged in a small bracelet-type input device. However, since these input keys are small, it is difficult to execute input operations. In addition, since it is difficult to recognize the input keys, input errors, such as pushing a wrong button, may be caused.

In addition, based on the phone device described in Patent Literature 2, only one type of ON/OFF operation, such as a teeth-clicking operation, is used as an input operation. Thus, it is difficult to realize operations corresponding to a plurality of functions of a target device to be operated.

In addition, based on the input device described in Patent Literature 3, since multiple gestures in which complex actions are combined are used as input operations, it is difficult to distinguish the input operations from daily actions. As a result, operations not intended by users may be inputted.

Thus, regarding execution of an input operation with respect to a portable electronic device, there is a demand for a technique so that the user does not need to extract the input device and can execute the input operation easily.

According to a first aspect of the present invention, there is provided an input device comprising:
a detection unit that detects a body movement generated by tapping a user body as detection data; and
an input information determination unit that refers to the detection data and determining a tap position based on a fact that the detection data varies depending on the tap position.

According to a second aspect of the present invention, there is provided an input method, comprising:
by a computer, detecting a body movement generated by tapping a user body as detection data; and
referring to the detection data and determining a tap position based on a fact that the detection data varies depending on the tap position.

According to a third aspect of the present invention, there is provided a non-transitory computer-readable storage medium that stores a program, causing a computer to execute: detecting a body movement generated by tapping a user body as detection data; and referring to the detection data and determining a tap position based on a fact that the detection data varies depending on the tap position.

According to a fourth aspect of the present invention, there is provided an input device comprising:
a detection unit that detects a body movement generated by tapping a user body as detection data; and
an input information determination unit that refers to the detection data, determines a tap position based on a fact that the detection data varies depending on the tap position, and outputs an operation command associated with the determined tap position.

According to a fifth aspect of the present invention, there is provided an input method, comprising:
by a computer, detecting a body movement generated by tapping a user body as detection data;
referring to the detection data and determining a tap position based on a fact that the detection data varies depending on the tap position; and
outputting an operation command associated with the determined tap position.

According to a sixth aspect of the present invention, there is provided a non-transitory computer-readable storage medium that stores a program, causing a computer to execute:
detecting a body movement generated by tapping a user body as detection data;
referring to the detection data and determining a tap position based on a fact that the detection data varies depending on the tap position; and
outputting an operation command associated with the determined tap position.

The present invention provides the following advantage, but not restricted thereto. Based on the input device, the input method, and the medium according to the present invention, when a user executes an input operation with respect to a portable electronic device, the user does not need to extract the input device and can execute the input operation easily.

BRIEF DESCRIPTION OF DRAWINGS

FIGS. 6A and 6B illustrate vibration waveforms extracted by the input device according to the first exemplary embodiment.

FIG. 14 is a flow chart illustrating a detailed operation for determining input information executed by the input device according to the second exemplary embodiment.

FIGS. 16A to 16C illustrate arm postures at the time of inputting and input areas of an input device according to a third exemplary embodiment.

PREFERRED MODES

Figure 1:
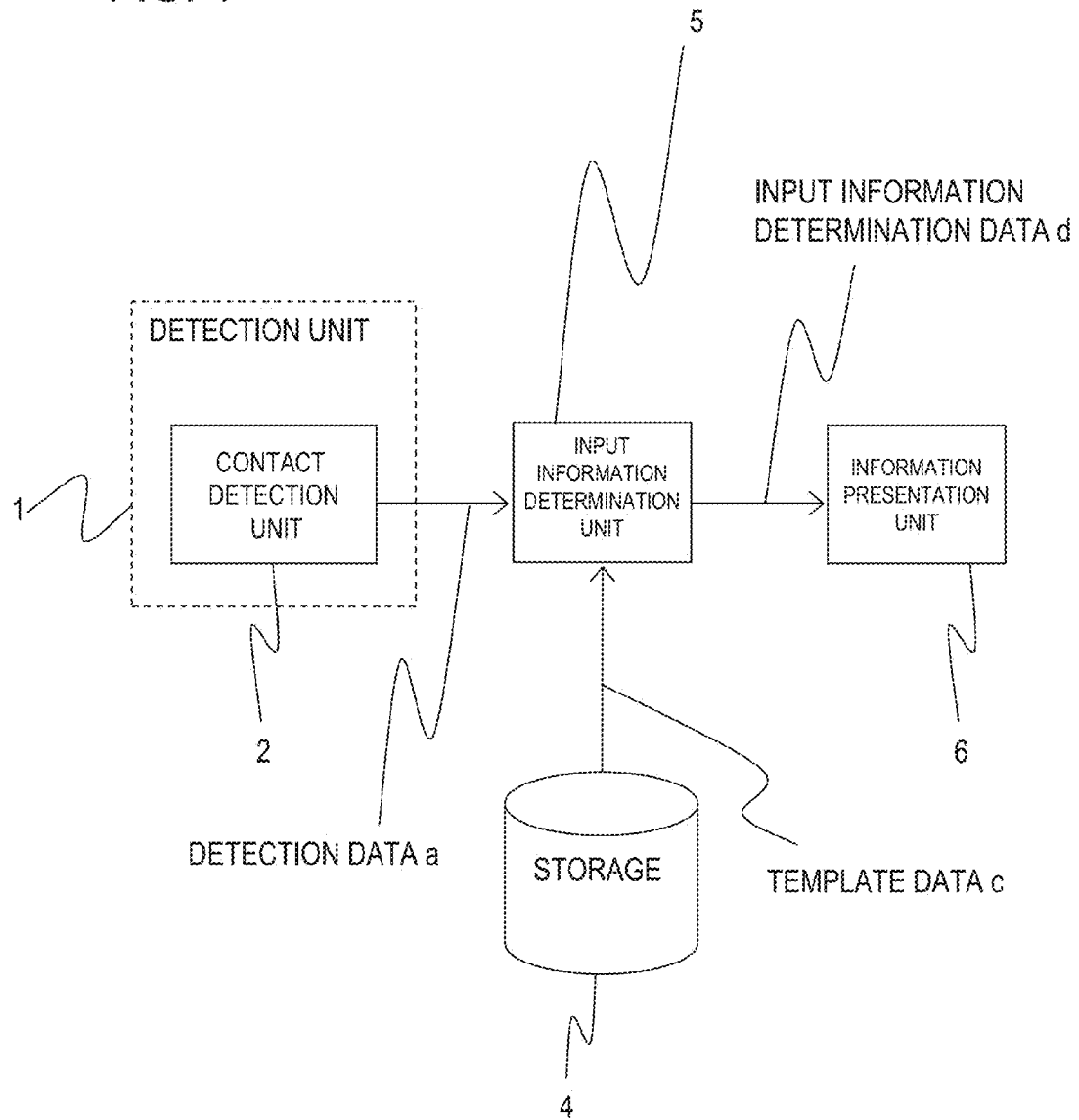
FIG. 1 is a block diagram illustrating a configuration of an input device according to a first exemplary embodiment.

In the present disclosure, there are various possible modes, which include the following, but not restricted thereto. According to a first extended mode, there is provided the input device according to the above first aspect.

According to a second extended mode, there is provided an input device, wherein the input information determination unit determines a tap position by classifying a feature of a waveform of the detection data by pattern matching.

According to a third extended mode, there is provided an input device, wherein the pattern matching is matching (DP matching) based on dynamic programming.

According to a fourth extended mode, there is provided an input device further comprising:
a storage unit that stores typical data about a body movement caused by tapping and the tap position correlated with the typical data, as template data, wherein
the input information determination unit determines a tap position by calculating a correlation between the typical data stored in the storage unit and the detection data.

According to a fifth extended mode, there is provided an input device, wherein the input information determination unit determines a tap position by classifying a feature of a waveform of the detection data by a rule.

According to a sixth extended mode, there is provided an input device, wherein the rule is based on an articulated structure model.

According to a seventh extended mode, there is provided an input device, wherein the body movement is an arm movement.

According to an eighth extended mode, there is provided an input device, wherein the input information determination unit outputs an operation command associated with the determined tap position.

According to a ninth extended mode, there is provided the input method according to the above second aspect.

According to a tenth extended mode, there is provided the program according to the above third aspect.

According to an eleventh extended mode, there is provided a computer-readable storage medium storing the above program.

According to a twelfth extended mode, there is provided the input device according to the fourth aspect.

According to a thirteenth extended mode, there is provided the input method according to the above fifth aspect.

According to a fourteenth extended mode, there is provided the program according to the sixth aspect.

According to a fifth extended mode, the input device may be configured so that the detection unit comprises an acceleration sensor and is arranged on a wrist on the tapped side and so that the input information determination unit determines an arm posture on the tapped side based on a gravitational acceleration detected by the acceleration sensor and outputs an operation command associated with a combination of the determined tap position and arm posture.

According to the present invention, tapping a body part can be allocated as an input operation. In addition, according to the present invention, a device detecting an input can be configured as a small bracelet-type device. Thus, the action of extracting the input device for device operations can be eliminated. As a result, since troublesome actions associated with input operations are unnecessary, the time required for input operations can be reduced.

In addition, according to the present invention, since an input area can be allocated to a user body part such as an arm, a sufficiently large input area can be assured. Thus, input errors can be prevented.

In addition, according to the present invention, since a plurality of input areas can be allocated, a plurality of kinds of input operations can be realized. Namely, input operations can be realized for a plurality of functions of a target device to be operated.

In addition, according to the present invention, since a certain operation, that is, touching a body, is used for input operations, the input operations can be distinguished from daily actions, and input operations not intended by the user can be prevented.

First Exemplary Embodiment

An input device according to a first exemplary embodiment will be described with reference to the drawings.

Figure 2:
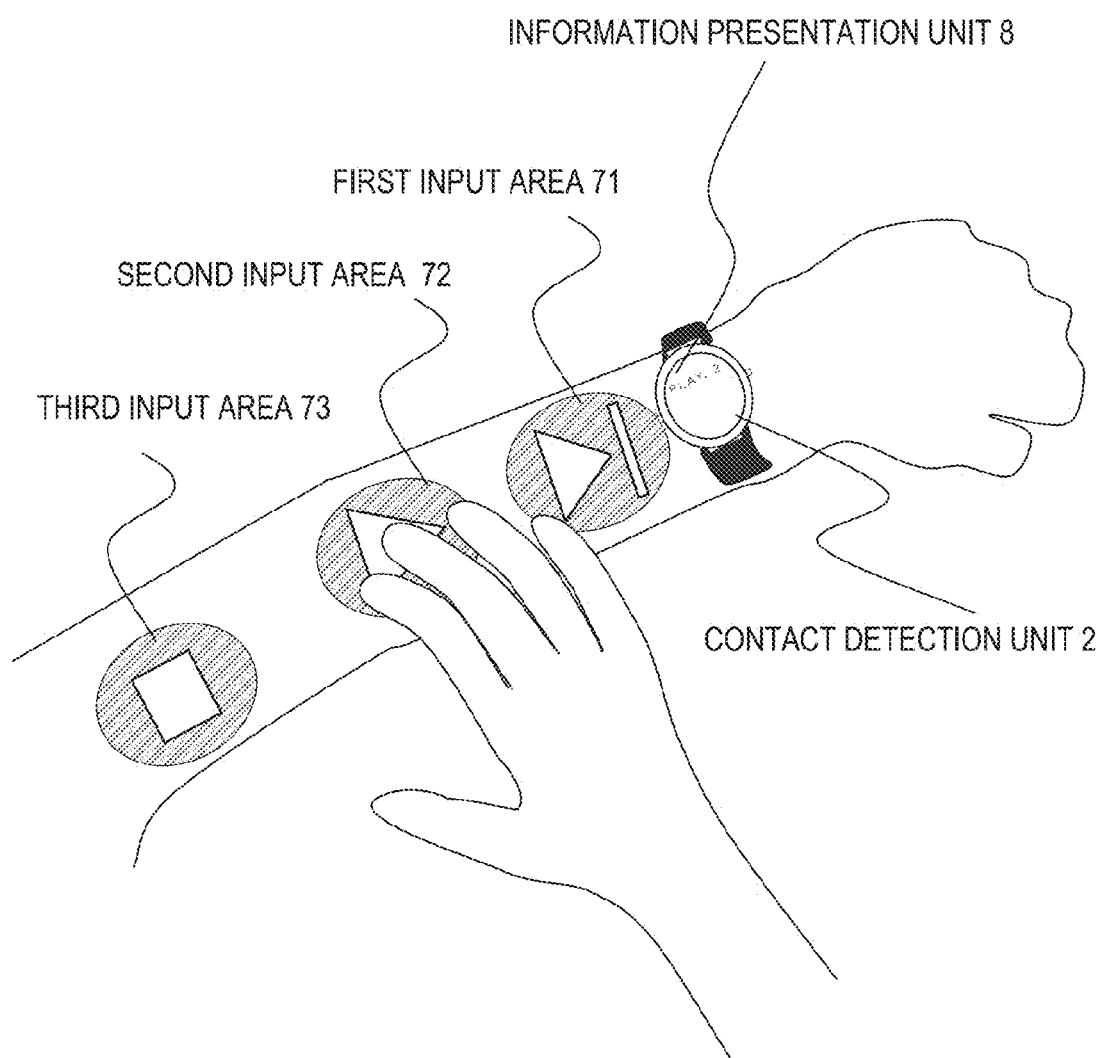
FIG. 2 illustrates detailed configurations of input areas of the input device according to the first exemplary embodiment.

FIG. 2 illustrates detailed configurations of input areas. In FIG. 2, a portable music player is used as a target device to be operated, and an arm of the user is used as an input part. Referring to FIG. 2, three input areas 71 to 73 for operating the device are arranged on the arm. The present exemplary embodiment will be described as an example, based on operations for listening to music. "Next Track," "Play/Pause," and "Stop" functions are allocated with the input areas 71 to 73 arranged on a wrist-side forearm, an upper-arm-side forearm, and an upper arm, respectively.

The user executes an input operation by tapping one of the input areas 71 to 73 on the arm with one hand. For example, when running or walking while listening to music, by giving a tap on the arm, the user can execute an input operation based on the tap position. In this way, the user can avoid troublesome actions of extracting the portable music player and operating small input keys.

FIG. 1 is a block diagram illustrating a configuration of an input device according to the present exemplary embodiment.

Referring to FIG. 1, the input device comprises a detection unit 1, a storage unit 4, an input information determination unit 5, and an information presentation unit 6.

The detection unit 1 comprises a contact detection unit 2. If the user gives a tap on the body, the contact detection unit 2 on the tapped side detects an arm movement and outputs detection data "a" depending on the arm movement.

The storage unit 4 previously stores template data "c" for correlating the detection data "a," which is detected by the contact detection unit 2 and which depends on movement of the arm having an articulated (or multi-joint) structure, with a tap position.

After receiving the detection data "a," the input information determination unit 5 refers to the template data "c" stored in the storage unit 4, executes matching to calculate correlation values, and determines the most highly correlated tap position. Next, the input information determination unit 5 outputs a command allocated with the tap position, as input information determination data "d."

After receiving the input information determination data "d," the information presentation unit 6 executes an operation based on the command, such as playing or stopping music. In addition, the information presentation unit 6 displays a screen corresponding to the operation.

Referring to FIG. 2, the contact detection unit 2 for detecting vibration is arranged on the left wrist, which is the tapped side.

Figure 3:
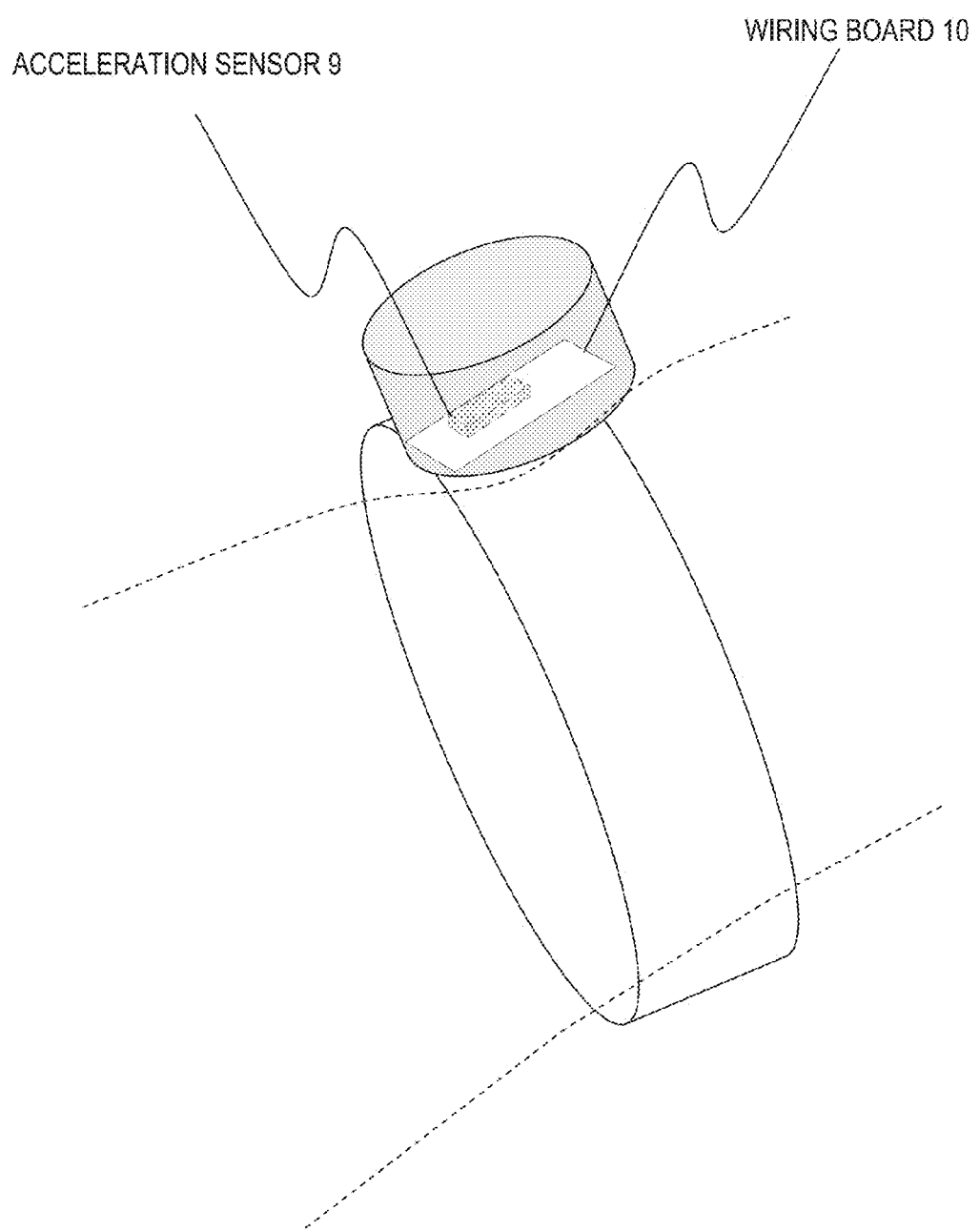
FIG. 3 illustrates a detailed configuration of a detection unit of the input device according to the first exemplary embodiment.

FIG. 3 illustrates a detailed configuration of the detection unit 1. Referring to FIG. 3, the contact detection unit 2 included in the detection unit 1 comprises an acceleration sensor 9 on a wiring board 10. The acceleration sensor 9 detects an arm movement as a triaxial acceleration. Herein, the X-axis is in parallel with the wiring board 10 and runs in the finger direction, the Y-axis is in parallel with the wiring board 10 and perpendicular to the X-axis, and the Z-axis is perpendicular to the wiring board 10.

Figure 4:
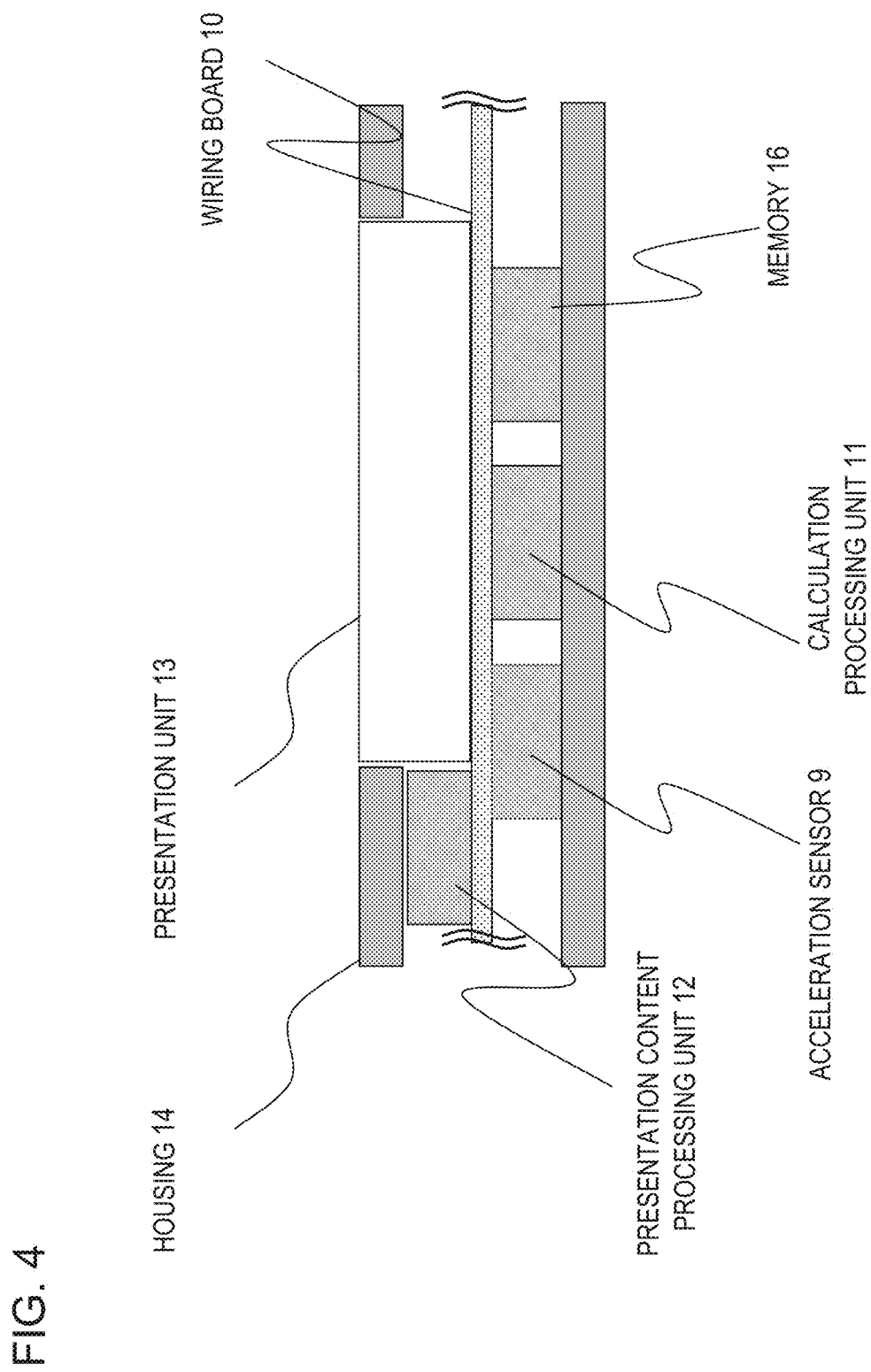
FIG. 4 is a sectional view illustrating the detailed configuration of the detection unit of the input device according to the first exemplary embodiment.

FIG. 4 is a sectional view illustrating a detailed configuration of the detection unit 1. Referring to FIG. 4, a memory 16, a calculation processing unit 11, a presentation content processing unit 12, and a presentation unit 13 are arranged on the wiring board 10, in addition to the acceleration sensor 9. These elements are housed in a housing 14.

The memory 16 holds the template data "c" of the storage unit 4. The calculation processing unit 11 executes processing of the input information determination unit 5. The presentation content processing unit 12 controls playing/stopping of music or texture on the screen outputted by the information presentation unit 6 based on a command allocated to a tap position. The presentation unit 13 outputs an audio signal controlled by the presentation content processing unit 12 via a speaker, transmits data to another presentation device using Bluetooth (registered mark) or the like, or outputs a controlled pixel signal as a display.

Next, an overall operation according to the present exemplary embodiment will be described with reference to drawings and flow charts.

Figure 5:
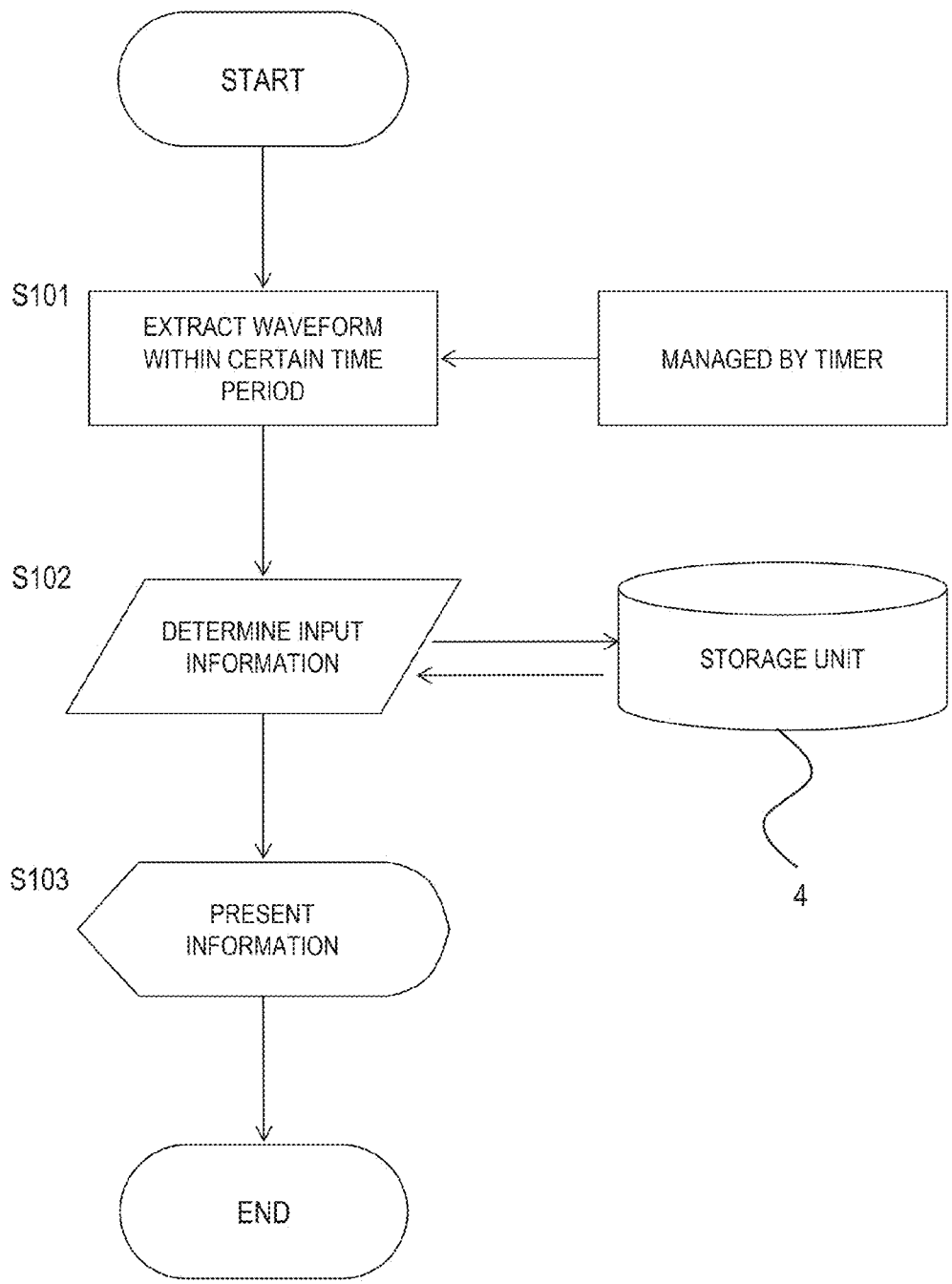
FIG. 5 is a flow chart illustrating an operation of the input device according to the first exemplary embodiment.

FIG. 5 is a flow chart illustrating an overall operation according to the present exemplary embodiment. Referring to FIG. 5, an overall operation according to the present exemplary embodiment is executed as follows.

First, by using one hand, the user taps one of the input areas 71 to 73 on the arm. The contact detection unit 2 extracts data within a certain time period from the detection data "a" representing a vibration waveform (step S101). The detection data "a" is time-series data of values detected by the acceleration sensor 9 per sampling period. For example, from the detection data "a," the contact detection unit 2 extracts a vibration waveform within a certain time period after the input operation detection timing, as data for determining the contact position.

The vibration waveform extracted in step S101 represents the movement of the arm on the tapped side. Because of an articulated (or multi-joint) structure of bones and joints, the movement of the arm differs depending on the tap position. Therefore, the storage unit 4 previously stores vibration waveforms depending on an arm movement and tap positions correlated with the vibration waveforms, as the template data "c."

After receiving the vibration waveform, the input information determination unit 5 refers to the template data "c" in the storage unit 4, executes matching to calculate correlation values, determine the most highly correlated tap position, and outputs a command allocated to the tap position, as the input information determination data "d" (step S102).

Finally, the information presentation unit 6 presents a predetermined symbol, data, or function allocated to the determined input area (step S103).

Next, a detailed operation of each of the steps will be described.

FIGS. 6A and 6B illustrate vibration waveforms extracted in step S101. After receiving a vibration waveform, which is time-series data of values detected by the contact detection unit 2, as the detection data "a," the input information determination unit 5 extracts, from the detection data "a," data within a certain time period from the input operation detection timing as data to be compared. FIG. 6A illustrates a vibration waveform detected by the contact detection unit 2. If sequential processing is executed on a value at each timing in the detection data, time is required for communication. Thus, it is preferable that the input information determination unit 5 receive the detection data at certain time intervals at once.

Next, a correlation between a vibration waveform depending on movement of an arm having an articulated structure and a tap position will be described.

Figure 7A:
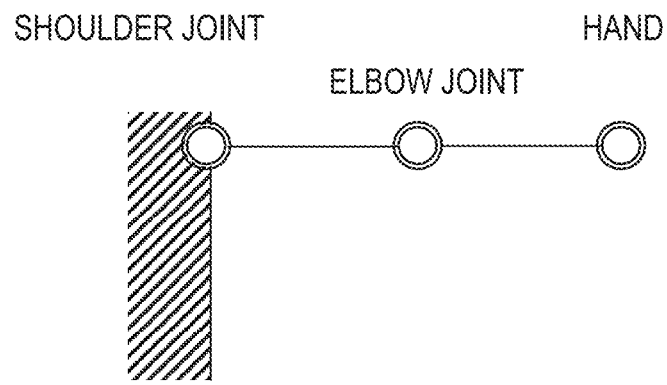
FIGS. 7A to 7C illustrate tap positions and arm movements corresponding thereto according to the first exemplary embodiment.
Figure 7B:
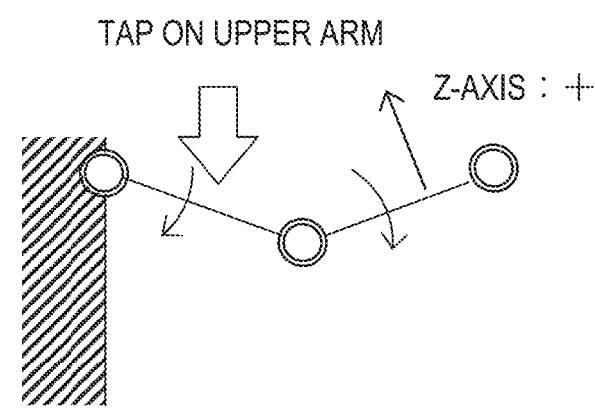
Figure 7C:
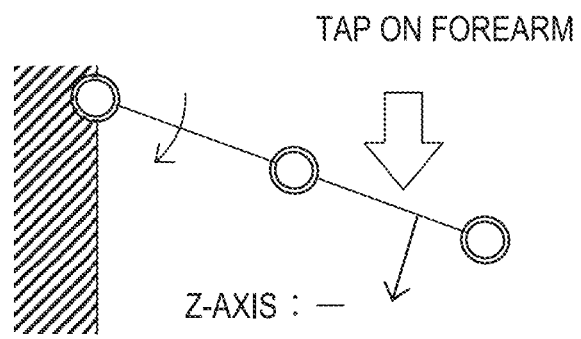

FIGS. 7A to 7C illustrate tap positions and arm movements corresponding thereto.

FIG. 7A illustrates an articulated structure (articulated rigid body) model in which an upper arm and a forearm are used as beams and a shoulder joint and an elbow joint are used as rotation axes having one degree of freedom.

FIG. 7B illustrates an arm movement when the upper arm is tapped. Overall, the arm is rotated around the shoulder joint clockwise. However, because of the inertia, the forearm portion is rotated around the elbow joint counterclockwise. Thus, the contact detection unit 2, which is detecting acceleration at the wrist, first detects acceleration in the positive direction along the Z-axis.

FIG. 7C illustrates an arm movement when the forearm is tapped. In this case, since the arm is stretched out, while not rotated around the elbow joint, the arm is rotated around the shoulder joint. Consequently, the contact detection unit 2 first detects acceleration in the negative direction along the Z-axis.

Thus, an arm movement caused when the arm is tapped changes depending on the tap position, and the acceleration value detected by the contact detection unit 2 arranged at the wrist also changes.

Figure 8:
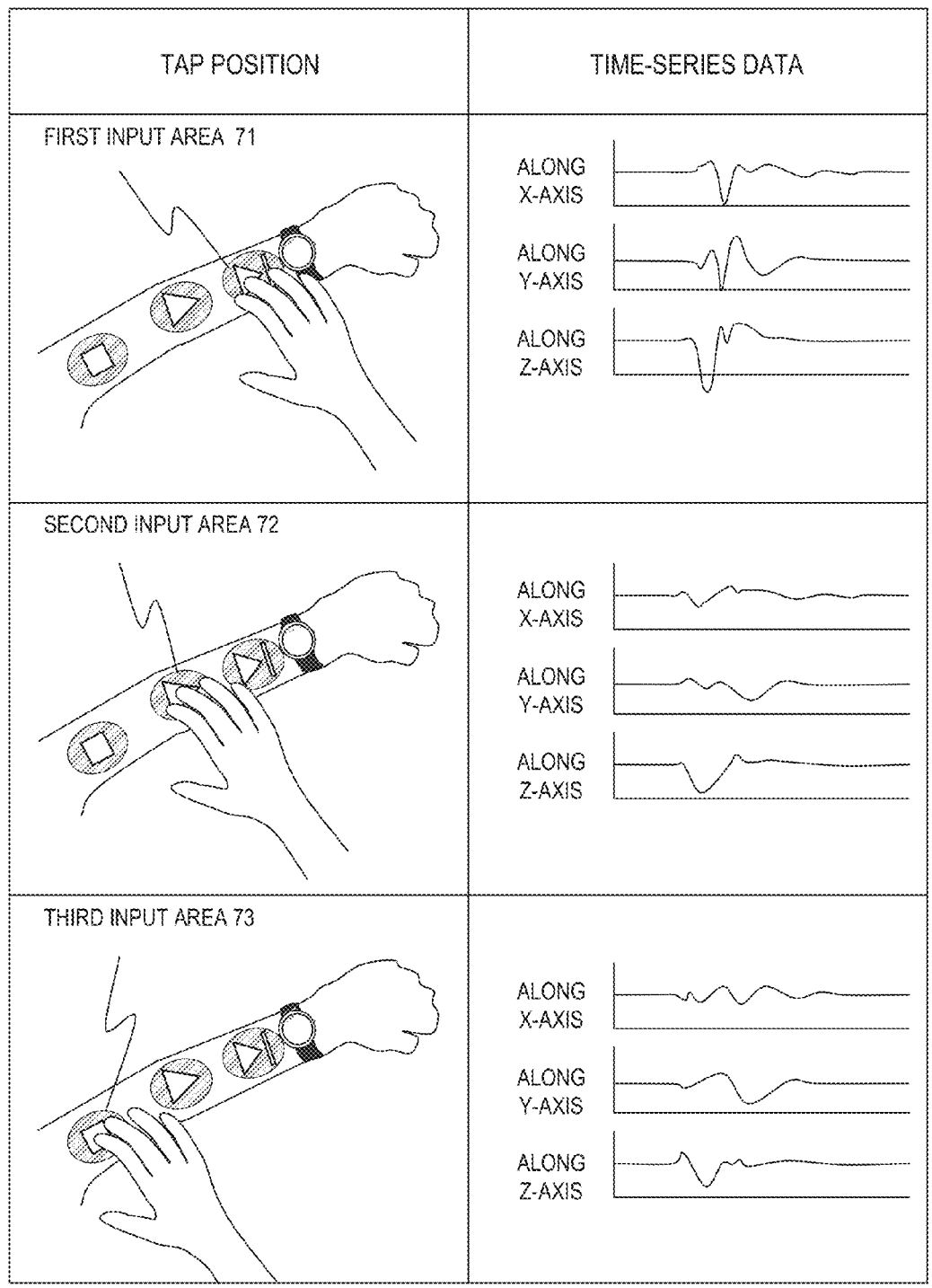
FIG. 8 is a table illustrating tap positions and time-series data corresponding thereto according to the first exemplary embodiment.

FIG. 8 is a table illustrating tap positions and time-series data corresponding thereto. The storage unit 4 stores the template data "c" for correlating time-series data, which represents a triaxial acceleration depending on an arm movement detected by the contact detection unit 2, with a tap position. Three areas of an arm, that is, the wrist-side forearm, the upper-arm-side forearm, and the upper arm on the tapped side, are set as the first to third input areas 71 to 73, respectively.

Next, step S102 in which the input information determination unit 5 refers to the template data "c" in the storage unit 4, executes matching to calculate correlation values, and determines the most highly correlated tap position will be described in more detail.

The input information determination unit 5 uses the extracted vibration waveform, which is as time-series data detected by the contact detection unit 2, as an input pattern. In addition, the input information determination unit 5 uses a plurality of template data "c" stored in the storage unit 4 as reference patterns. The input information determination unit 5 executes matching based on Dynamic Programming (DP) to calculate correlation values between the input pattern and each of the reference patterns.

Figure 9:
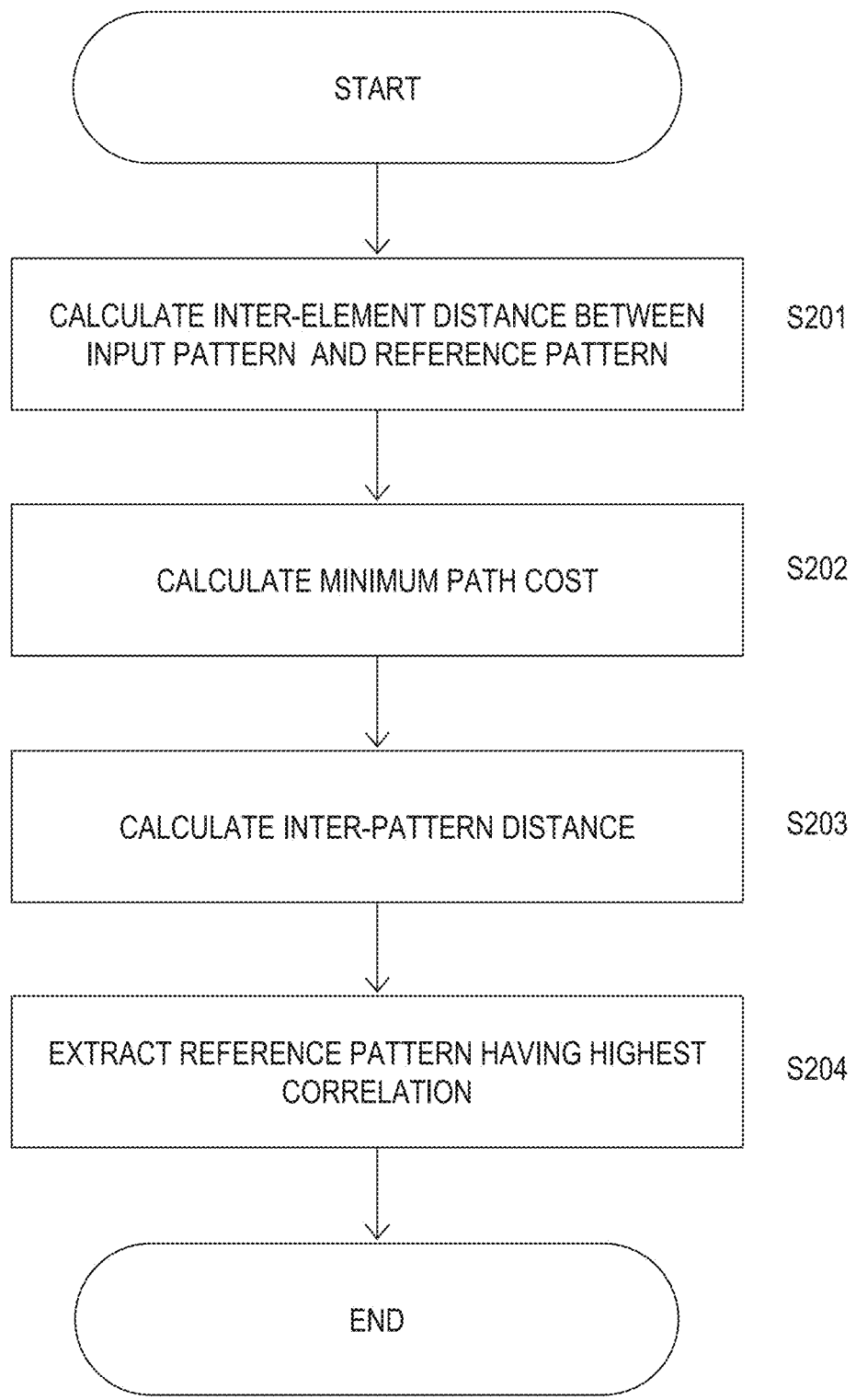
FIG. 9 is a flow chart illustrating a detailed operation for determining input information executed by the input device according to the first exemplary embodiment.

FIG. 9 is a flow chart illustrating a detailed operation of step 102 of determining input information. Referring to FIG. 9, step 102 of determining input information comprises: step S201 of calculating the inter-element distance between an input pattern and a reference pattern for each element; step S202 of using the calculated inter-element distances to calculate minimum path costs; step S203 of using the calculated minimum path costs to calculate the distance between the input pattern and the reference pattern; and step S204 of determining a reference pattern indicating the smallest inter-pattern distance among a plurality of reference patterns as a tap position.

First, a vibration waveform extracted from the detection data "a" used in the present exemplary embodiment is time-series data representing an arm movement detected by the contact detection unit 2 on the tapped side. Thus, the input pattern is represented by expression 1.

$$P=(P_1, P_2, \ldots, P_i, \ldots, P_I)$$ [expression 1]

In expression 1, subscript i (i=1, ..., I) indicates that the input pattern is formed by time series data.

Since each of the time-series data includes the acceleration data along the three axes, that is, the X-, Y-, and Z-axes, axial components of the input pattern are represented by expression 2.

$$P_i=(P_{ix}, P_{iy}, P_{iz})$$ [expression 2]

Likewise, since the template data "c" is time-series data, a reference pattern is represented by expression 3.

$$R_k=(r_1^k, r_2^k, \ldots, r_j^k, \ldots, r_J^k)$$ [expression 3]

In expression 3, subscript j (j=1, ..., J) indicates that the reference pattern is formed by time-series data and superscript k is used to distinguish a plurality of reference patterns.

Since each of the time-series data includes the acceleration data along the three axes, that is, the X-, Y-, and Z-axes, components of the reference pattern are represented by expression 4.

$$r_j=(r_{jx}, r_{jy}, r_{jz})$$ [expression 4]

Figure 10:
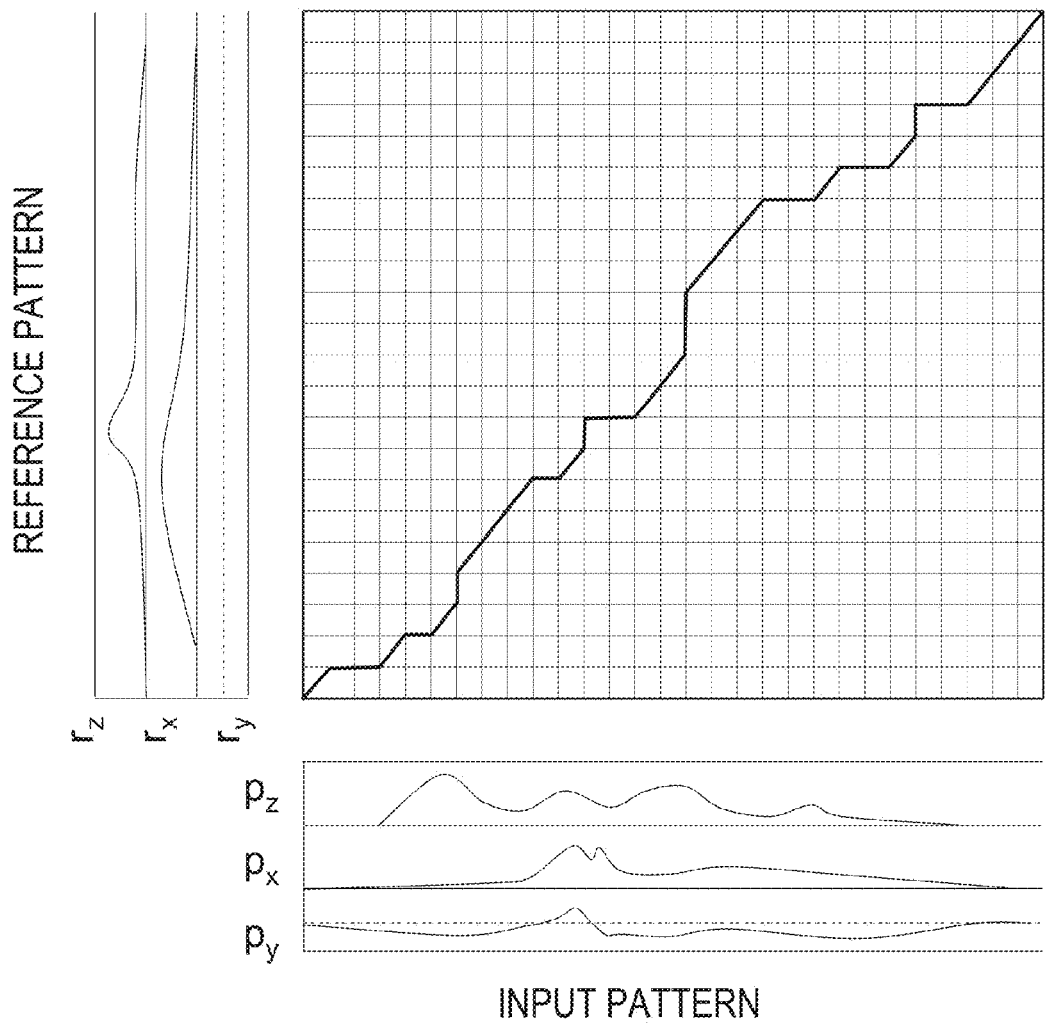
FIG. 10 illustrates a DP matching path diagram according to the first exemplary embodiment.

DP matching is used to calculate the inter-pattern distance between the input pattern and each reference pattern. FIG. 10 is a DP matching path diagram. Referring to FIG. 10, a grid is formed by DP input and reference patterns. Costs are set on paths of the grid, and a path having the smallest total cost and the total cost of the path are calculated.

First, the inter-element distance between the detection data "a" and the template data "c" is calculated (step S201). An element signifies a component at each timing in the input pattern and the reference pattern.

The cost at grid point (i,j) can be calculated as an inter-element distance by expression 5.

$$d(i,j)=|p_i-r_j^k|=\sqrt{(p_{ix}-r_{jx}^k)^2+(p_{iy}-r_{jy}^k)^2+(p_{iz}-r_{jz}^k)^2}$$ [expression 5]

Expression 5 is used to calculate an inter-element distance for each of the grid points.

Figure 11:
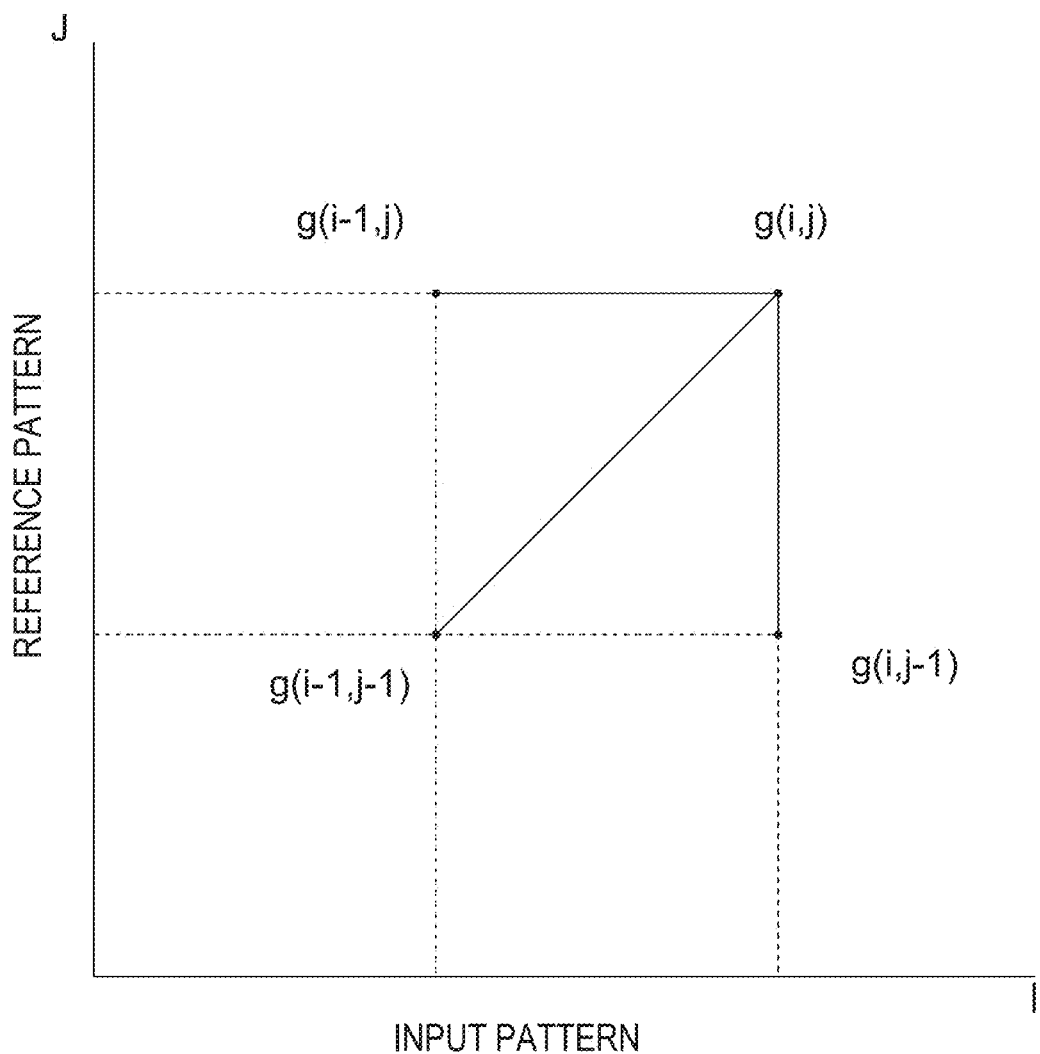
FIG. 11 illustrates a minimum accumulated cost on a grid point according to the first exemplary embodiment.

Next, a minimum path cost is calculated (step S202). A minimum accumulated cost on a grid point will be described with reference to FIG. 11. Referring to FIG. 11, expression 6 represents grid point costs at grid point (i,j), and a minimum path cost as an expression that determines a minimum value among the grid point costs.

$$g(i, j) = \min\begin{cases} g(i-1, j) + d(i, j) \\ g(i-1, j-1) + 2d(i, j) \\ g(i, j-1) + d(i, j) \end{cases}$$ [expression 6]

Expression 6 includes symmetric-type path limitation. Expression 6 is applied repeatedly in ascending order of the time-series i,j to calculate a minimum path cost.

Next, an inter-pattern distance is calculated (step S203). Expression 7 represents the inter-pattern distance for (I,J). By using expression 7, the inter-pattern distance between the input pattern and the k-th reference pattern is determined.

$$D(P, R) = \frac{g(I, J)}{I + J}$$ [expression 7]

Next, among a plurality of reference patterns, a reference pattern having the highest correlation is extracted (step S204). Steps S201 to S203 are executed for all the previously set reference patterns, and a reference pattern exhibiting the shortest inter-pattern distance is determined as the most highly correlated tap position. In addition, a command allocated with the tap position is outputted as the input information determination data "d."

Next, a detailed operation of the information presentation unit 6 in step S103 will be described.

After receiving the input information determination data "d" determined by the input information determination unit 5, the information presentation unit 6 presents a function allocated to the input position to the user. In the present exemplary embodiment, operations of listening to music are assumed. Thus, based on a function such as "Play/Pause" or "Next Track" allocated to each input area, music data is controlled and sound is outputted from a speaker.

For example, based on a function allocated to each input area, the data may be transmitted to an earphone or headphones via Bluetooth or the like. In addition, the title of the music piece being played or the function being executed may be displayed on a display.

In the present exemplary embodiment, correlation values are calculated by DP matching. However, as long as matching is executed between an input pattern and a reference pattern, another pattern matching method may be used.

In addition, the inter-element distance calculation method using DP matching and the path limitation expressions for calculating path costs are used as examples. The present invention is not limited to such examples.

In addition, in the present exemplary embodiment, the three input areas 71 to 73 are arranged on an arm, and a command is allocated to each of the input areas. However, the number of input areas and the commands allocated thereto may be arbitrarily set as needed. Namely, the number of input areas and the commands allocated thereto are not limited to the mode of the present exemplary embodiment.

In addition, in the present exemplary embodiment, all the input areas 71 to 73 are arranged on an arm having an articulated structure. However, as long as movement of the acceleration sensor 9 in contact with the tapped side differs depending on a tap position, the input areas may be set on a position different from the arm. In addition, the input areas may be arranged on a position other than a part having an articulated structure.

In addition, in the present exemplary embodiment, the detection unit is mounted on a wrist. However, the detection unit may be mounted on a position other than a wrist. Namely, the detection unit may be mounted on an upper arm, a glove, a ring, an ankle, or the like. In addition, the detection unit may be mounted on a device held by a user.

Second Exemplary Embodiment

An input device according to a second exemplary embodiment will be described with reference to the drawings.

In the first exemplary embodiment, a vibration waveform depending on movement of an arm having an articulate (or multi-joint) structure is used for matching to calculate correlation values and determine a tap position. However, in the present exemplary embodiment, a vibration waveform feature depending on an arm movement is classified by a rule, to determine a tap position.

Figure 12:
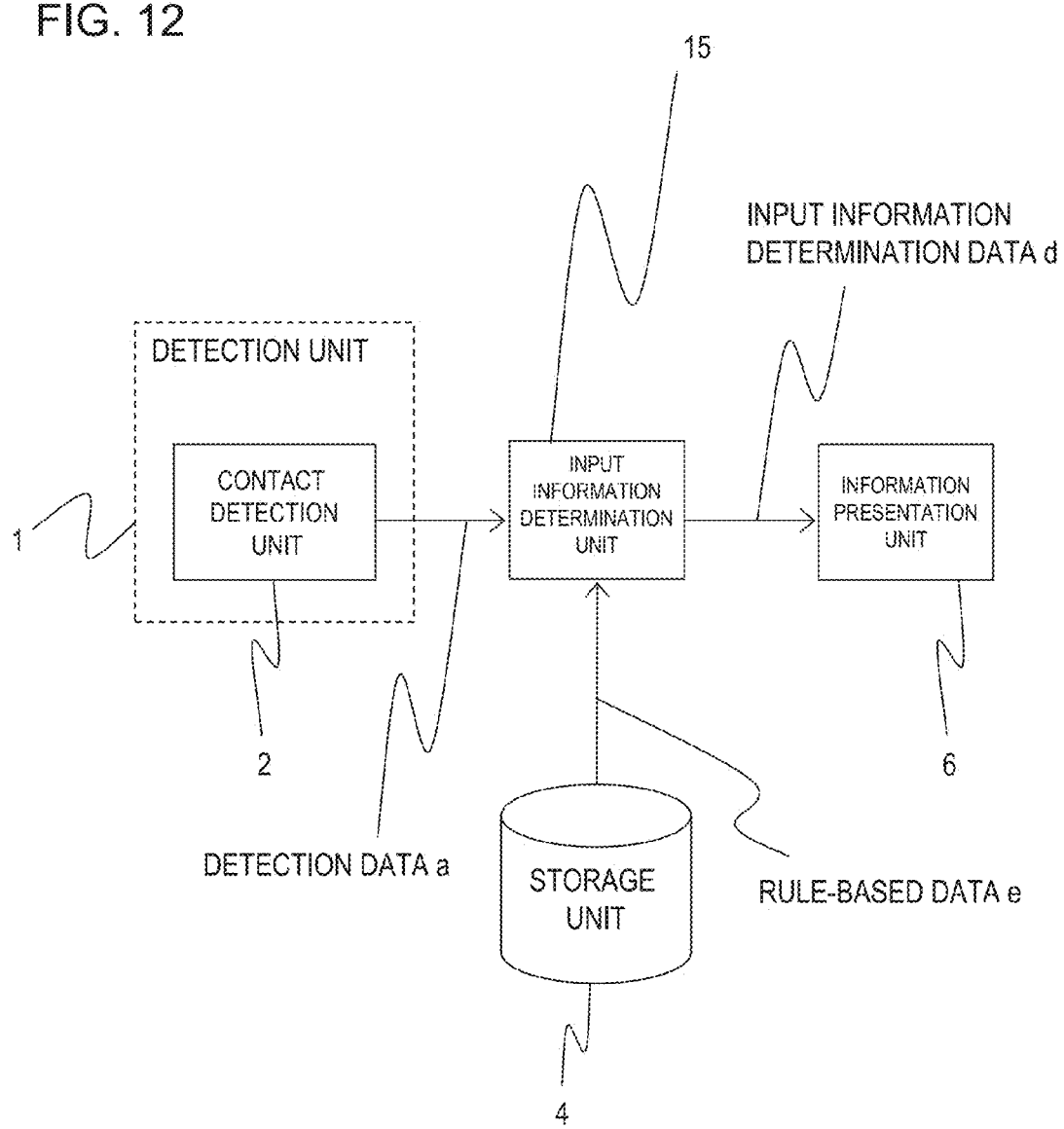
FIG. 12 is a block diagram illustrating a configuration of an input device according to the second exemplary embodiment.

FIG. 12 is a block diagram illustrating a configuration of an input device according to the present exemplary embodiment. In the first exemplary embodiment, to determine a tap position, the storage unit 4 previously stores the template data "c" for correlating a vibration waveform, which is detected by the contact detection unit 2 and which depends on movement of an arm having an articulated structure, with a tap position. However, in the present exemplary embodiment illustrated in FIG. 12, the storage unit 4 previously stores rule-based data "e" for correlating a vibration waveform feature, which depends on an arm movement detected by the contact detection unit 2, with a tap position.

In addition, instead of the input information determination unit 5 according to the first exemplary embodiment, the input device according to the present exemplary embodiment comprises an input information determination unit 15. When receiving the detection data "a," the input information determination unit 15 refers to the rule-based data "e," classifies the vibration waveform feature, which depends on an arm movement detected by the contact detection unit 2, by a rule, and determines a tap position.

Next, an operation of the input device according to the present exemplary embodiment will be described.

In the first exemplary embodiment, after receiving a vibration waveform depending on an arm movement detected by the contact detection unit 2, the input information determination unit 15 refers to the template data "c," executes matching to calculate correlation values, and determines a tap position. However, in the present exemplary embodiment, the input information determination unit 15 determines a tap position, by classifying a vibration waveform feature, which depends on an arm movement detected by the contact detection unit 2, by a rule in the rule-based data "e."

First, an operation of the input information determination unit 15 will be described in detail.

Figure 13:
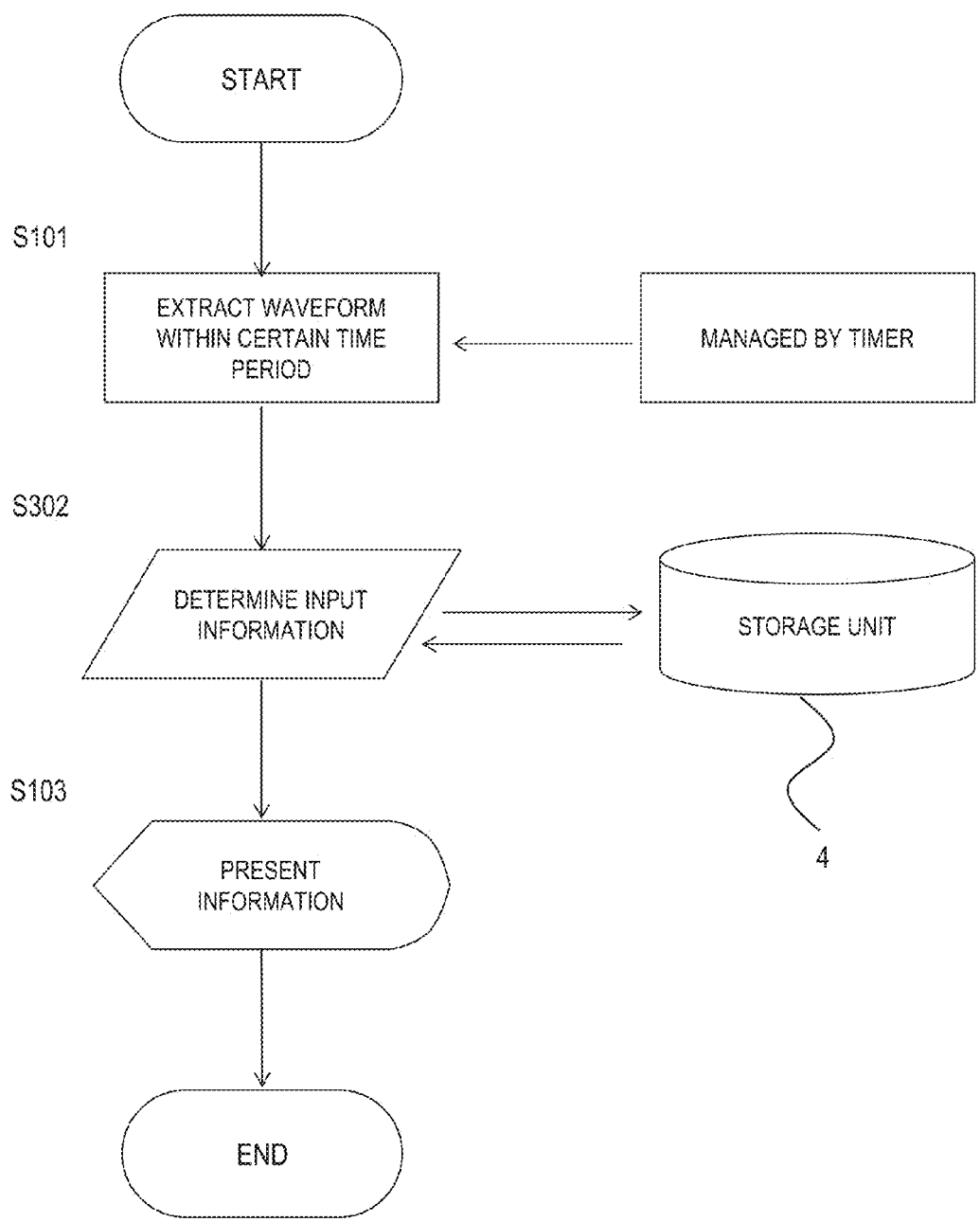
FIG. 13 is a flow chart illustrating an operation of the input device according to the second exemplary embodiment.

FIG. 13 is a flow chart illustrating an operation of the input device according to the present exemplary embodiment. In the first exemplary embodiment, in step S102, the input information determination unit 5 refers to the template data "c" of the storage unit 4, executes matching to calculate correlation values, and determines a tap position. However, in the present exemplary embodiment, in step S302, the input information determination unit 15 refers to the rule-based data "e," classifies a vibration waveform feature, which depends on an arm movement detected by the contact detection unit 2, by a rule, and determines a tap position (step S302).

FIG. 14 is a flow chart illustrating an operation of the input information determination unit 15 of the input device according to the present exemplary embodiment. In the first exemplary embodiment, as described with reference to FIG. 7, if the contact detection unit 2 detects that the initial acceleration along the Z-axis is in the positive direction, the input information determination unit 15 classifies the tap position as the third input area 73 (upper arm). If the initial acceleration along the Z-axis exhibits the negative direction (No in step S401), the input information determination unit 15 classifies the tap position as any one of the input areas other than the third input area 73.

Next, regarding the acceleration along the Z-axis detected by the contact detection unit 2, a main vibration, which is a maximum vibration amplitude, is examined.

Figure 15A:
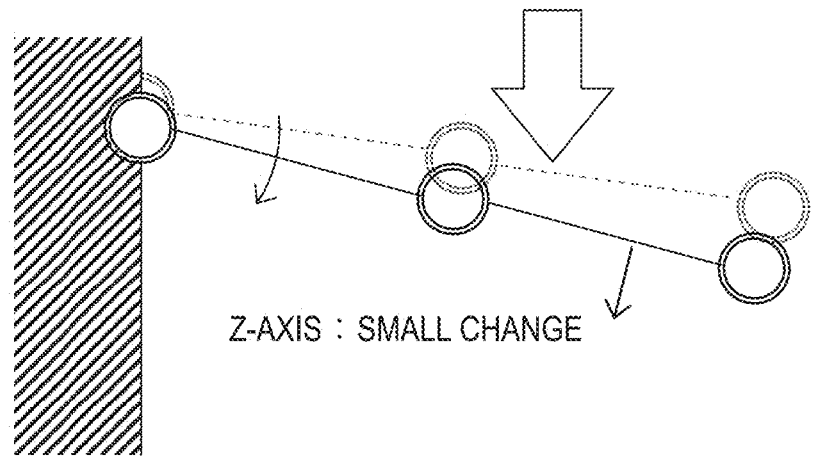
FIGS. 15A and 15B illustrate tap positions and arm movements corresponding thereto according to the second exemplary embodiment.
Figure 15B:
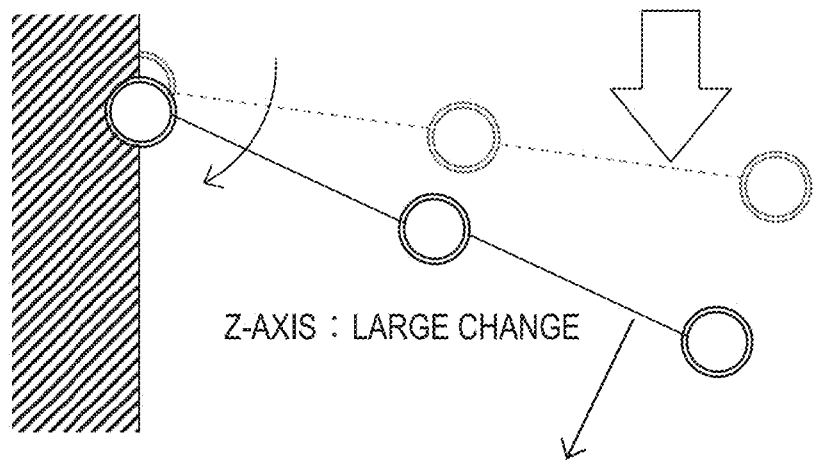

FIGS. 15A and 15B illustrate tap positions and arm movements corresponding thereto. FIGS. 15A and 15B illustrate arm motions around a shoulder joint. FIG. 15A illustrates an arm motion around a shoulder joint when an upper-arm-side forearm (the second input area 72) is tapped. FIG. 15B illustrates an arm motion around a shoulder joint when a wrist-side forearm (the first input area 71) is tapped.

As seen from comparison between FIG. 15A and FIG. 15B, when the first input area 71, which is farther from the shoulder rotation axis, is tapped, since a larger force of moment is caused on the arm, larger acceleration is generated along the Z-axis. Thus, a threshold is set as a reference. In this way, if the maximum amplitude along the Z-axis is equal to or less than the threshold, the input information determination unit 15 can classify the tap position as the second input area 72 (the upper-arm-side forearm) and if the maximum amplitude along the Z-axis exceeds the threshold (step S402) the input information determination unit 15 can classify the tap position as the first input area 71 (the wrist-side forearm).

In the present exemplary embodiment, the tap position is classified by a rule using only the acceleration along the Z-axis. However, the tap position may be classified by a rule using acceleration along the X-axis generated by angular acceleration around the contact detection unit 2.

In addition, in the present exemplary embodiment, the input areas 71 to 73 are arranged on an upper arm, an upper-arm-side forearm, and a wrist-side forearm, and all the input areas 71 to 73 are arranged on the back of the arm. However, the input areas 71 to 73 are not necessarily arranged on the same plane.

For example, if input areas are arranged on a fist unit, depending on the direction in which the fist is tapped, five input areas can be arranged. Namely, when a fist is formed, five sides, namely, the side formed by the middle phalanxes of four fingers, the radius side near the thumb (a lateral side of the fist), the ulna side near the little finger (a lateral side of the fist), the palm side (the bottom side of the fist), and the back side of the hand (the top side of the fist), can be used as the input areas.

If one of the input areas is tapped, the contact detection unit 2 first detects acceleration in the negative direction along the X-axis, in the positive direction along the Y-axis, in the negative direction along the Y-axis, in the positive direction along the Z-axis, or in the negative direction along the Z-axis. By using these axes and directions as a rule, even if input operations are given to the sides in different directions, determination of the tap position is possible. The input device may be configured so that an input can be detected even if the user strikes an object with the fist.

Third Exemplary Embodiment

An input device according to a third exemplary embodiment will be described with reference to the drawings.

In the second exemplary embodiment, the three input areas 71 to for operating a device are arranged on an arm, and the input information determination unit 15 determines a tap position by classifying a vibration waveform feature, which depends on an arm movement generated by a tap, by a rule. However, in the present exemplary embodiment, an input information determination unit classifies a vibration waveform feature, which depends on an arm movement, by a rule, and classifies an arm posture on the tapped side based on detection data "p" from the contact detection unit 2. In this way, different operation commands can be allocated to inputs given to the same input area.

FIGS. 16A to 16C illustrate arm postures at the time of inputting and input areas. FIGS. 16A to 16C illustrate arms held up (or upward), horizontally, and down (or downward), respectively. Depending on the arm posture, a different operation command is allocated to each input area.

In the present exemplary embodiment, operations of a music player are exemplified. Referring to FIG. 16A, when the user holds the arm up, "Fast-Forward," "Play/Pause," and "Rewind" commands are allocated to the input areas 71 to 73 arranged on the wrist-side forearm, the upper-arm-side forearm, and the upper arm, respectively. Referring to FIG. 16B, when the user holds the arm horizontally, "Next Track," "Play/Pause," and "Stop" commands are allocated to the input areas 71 to 73, respectively. Referring to FIG. 16C, when the user holds the arm down, "Mute," "Volume DOWN," and "Volume UP" commands are allocated to the input areas 71 to 73, respectively.

Figure 17:
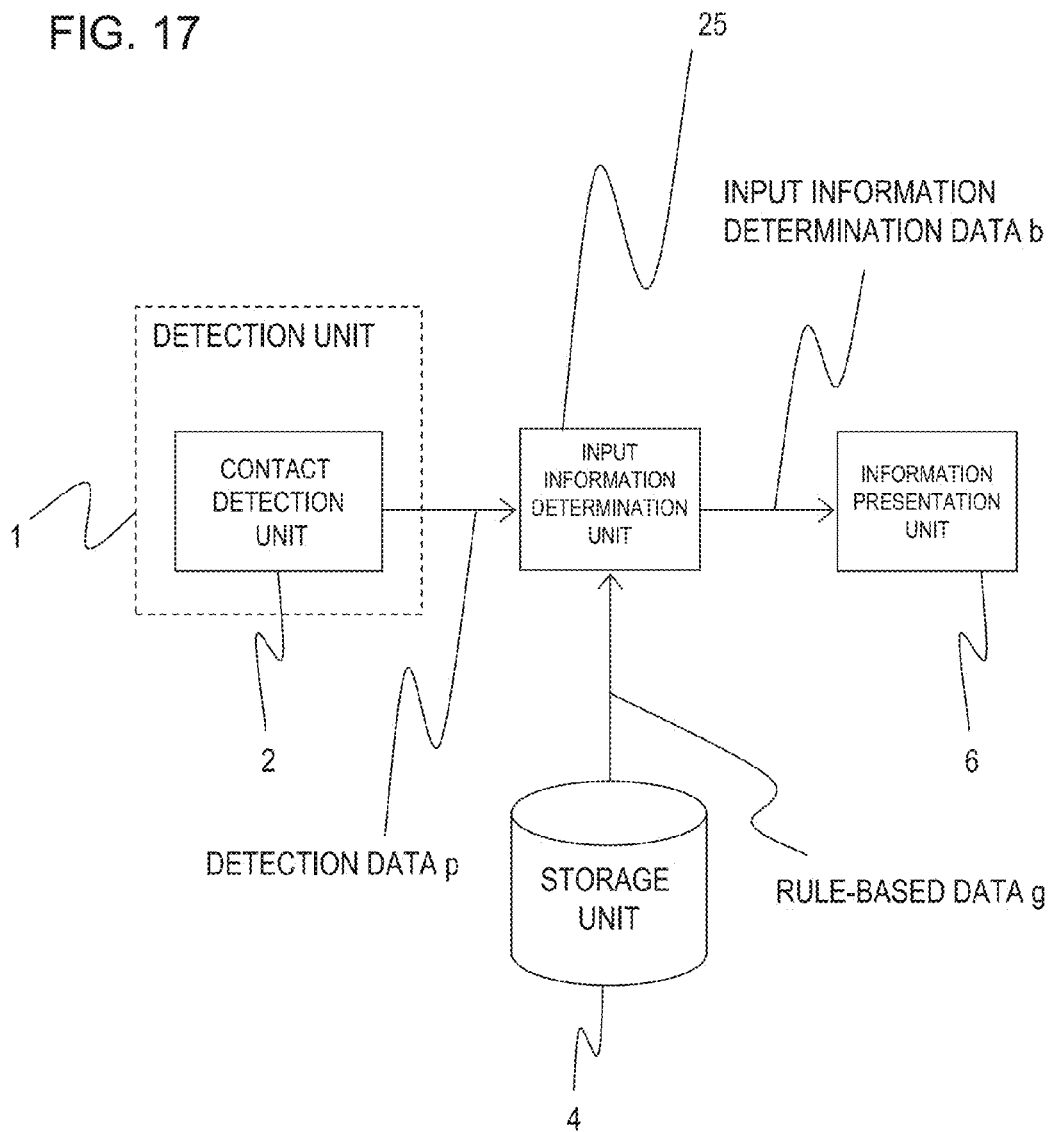
FIG. 17 is a block diagram illustrating a configuration of the input device according to the third exemplary embodiment.

FIG. 17 is a block diagram illustrating a configuration of an input device according to the present exemplary embodiment. In the second exemplary embodiment, to determine a tap position, the storage unit 4 previously stores the rule-based data "e" for correlating a vibration waveform feature, which depends on an arm movement detected by the contact detection unit 2, with a tap position (FIG. 12). However, in the present exemplary embodiment, an arm posture based on the contact detection unit 2 is combined with the correlation between a vibration waveform feature depending on an arm movement detected by the contact detection unit 2 and a tap position. Namely, the storage unit 4 previously stores rule-based data "g" for correlating a combination of a tap position and an arm posture with an operation command.

Referring to FIG. 17, the input device according to the present exemplary embodiment comprises an input information determination unit 25, instead of the input information determination unit 15 (FIG. 12) according to the second exemplary embodiment. After receiving the detection data "p," the input information determination unit 25 refers to the rule-based data "g" in the storage unit 4, determines a vibration waveform feature depending on an arm movement and an arm posture detected by the contact detection unit 2, and determines an operation command allocated to a combination of the tap position and the arm posture.

A command outputted based on the operation command determined by a combination of the tap position and the arm posture is referred to as input information determination data "b."

Next, an operation of the input device according to the present exemplary embodiment will be described.

Figure 18:
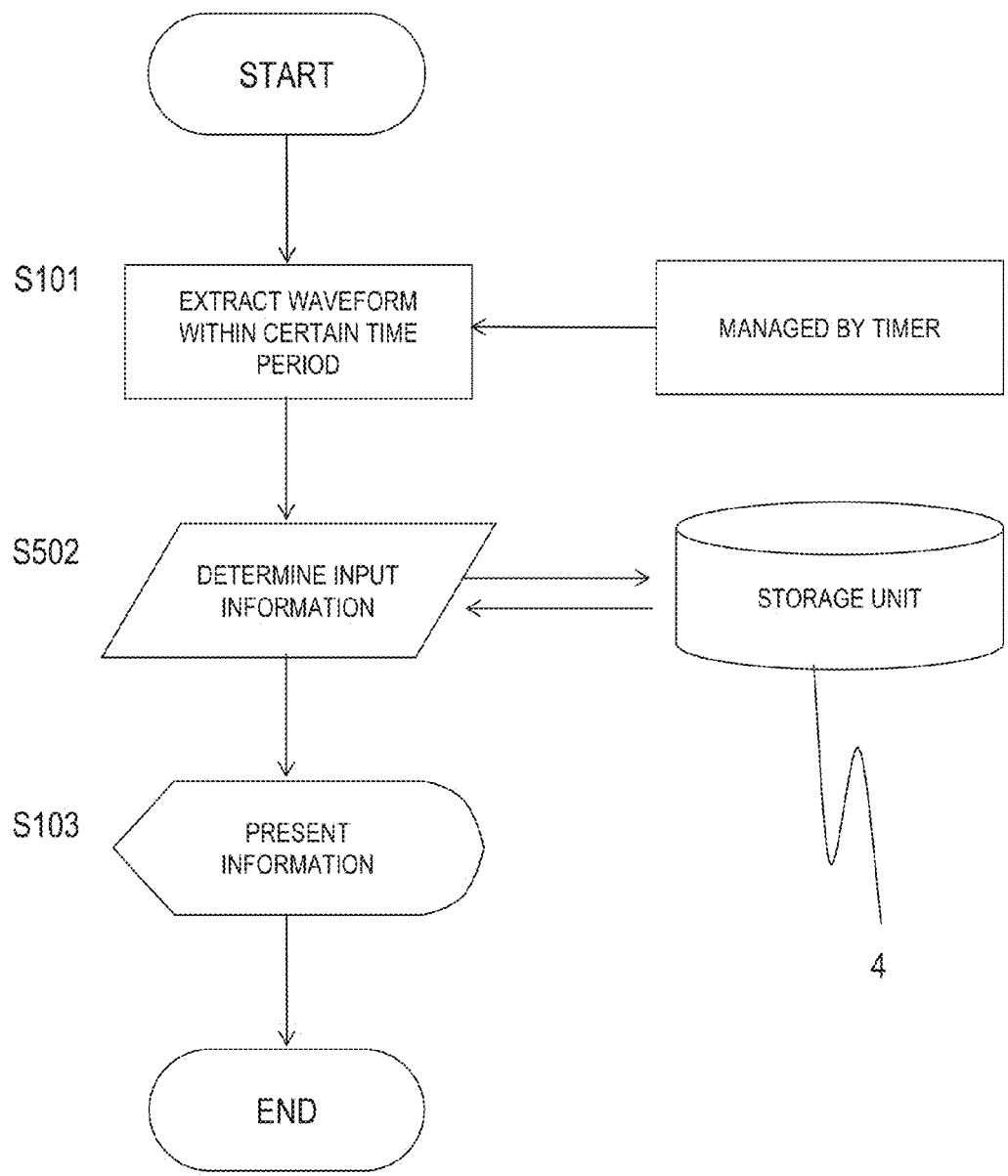
FIG. 18 is a flow chart illustrating an operation of the input device according to the third exemplary embodiment.

FIG. 18 is a flow chart illustrating an operation of the input device according to the present exemplary embodiment. In step S302 in FIG. 13 and steps S401 and 402 in FIG. 14, the input device according to the second exemplary embodiment classifies a vibration waveform feature depending on an arm movement by a rule and determines a tap position. However, in step S502, after extracting a tap position from a vibration waveform feature depending on an arm movement based on a rule, the input device according to the present exemplary embodiment extracts an arm posture based on the detection data "p" and determines an operation command allocated to the combination of the tap position and the arm movement (step S502).

Next, an operation of the input information determination unit 25 will be described in detail.

Figure 19:
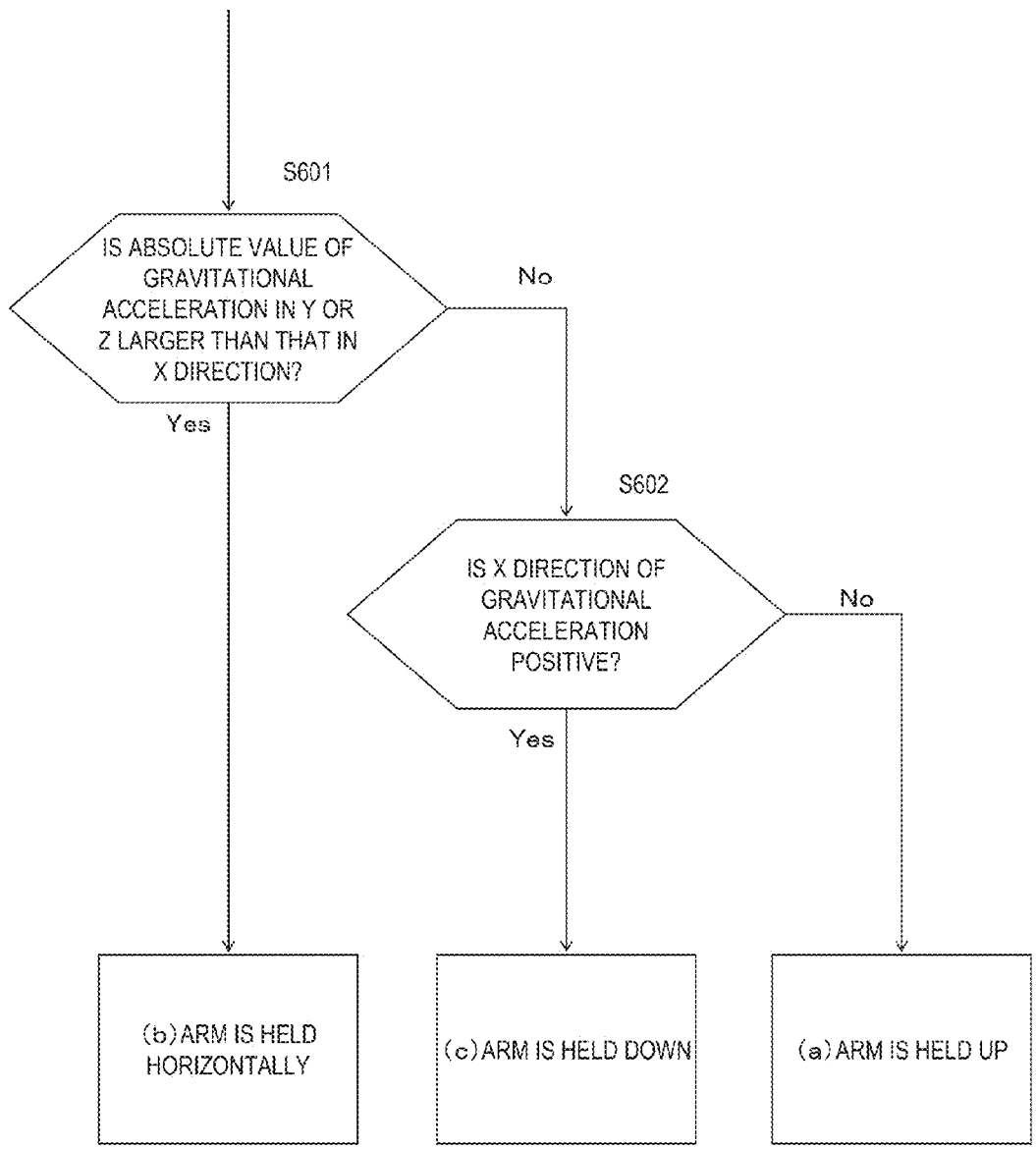
FIG. 19 is a flow chart illustrating a detailed operation for determining input information executed by the input device according to the third exemplary embodiment.

FIG. 19 is a flow chart illustrating an operation of the input information determination unit 25 of the input device according to the present exemplary embodiment. As in the second exemplary embodiment described with reference to FIG. 14, after extracting a tap position from a vibration waveform feature depending on an arm movement based on a rule, the input information determination unit 25 extracts an arm posture. For example, the input information determination unit 25 can extract an arm posture by using the directions of gravitational acceleration detected by the acceleration sensor 9 of the contact detection unit 2.

First, based on the detected gravitational acceleration directions, the input information determination unit 25 determines an arm posture (step S601). If the absolute value of gravitational acceleration in the Y or Z direction is larger than that in the X direction (Yes in step S601), the input information determination unit 25 determines that the arm is held horizontally (FIG. 16B). Assuming that the gravitational acceleration is ($a_X$, $a_Y$, $a_Z$), if the relationship sqrt($a_Y^2+a_Z^2$)>abs($a_X$) is satisfied, the input information determination unit 25 may determine that the arm is held horizontally (FIG. 16B). The functions sqrt and abs represent "square root" and "absolute value," respectively.

If the absolute value of gravitational acceleration in the X direction is larger than those in the Y and Z directions (No in step S601), the input information determination unit 25 classifies the direction in which the gravitational acceleration is detected, the direction depending on the arm posture (step S602). If the acceleration in the X direction is positive (Yes in step S602), the input information determination unit 25 determines that the arm is held down (FIG. 16C). If the acceleration in the X direction is negative (No in step S602), the input information determination unit 25 determines that the arm is held up (FIG. 16A).

Figure 20:
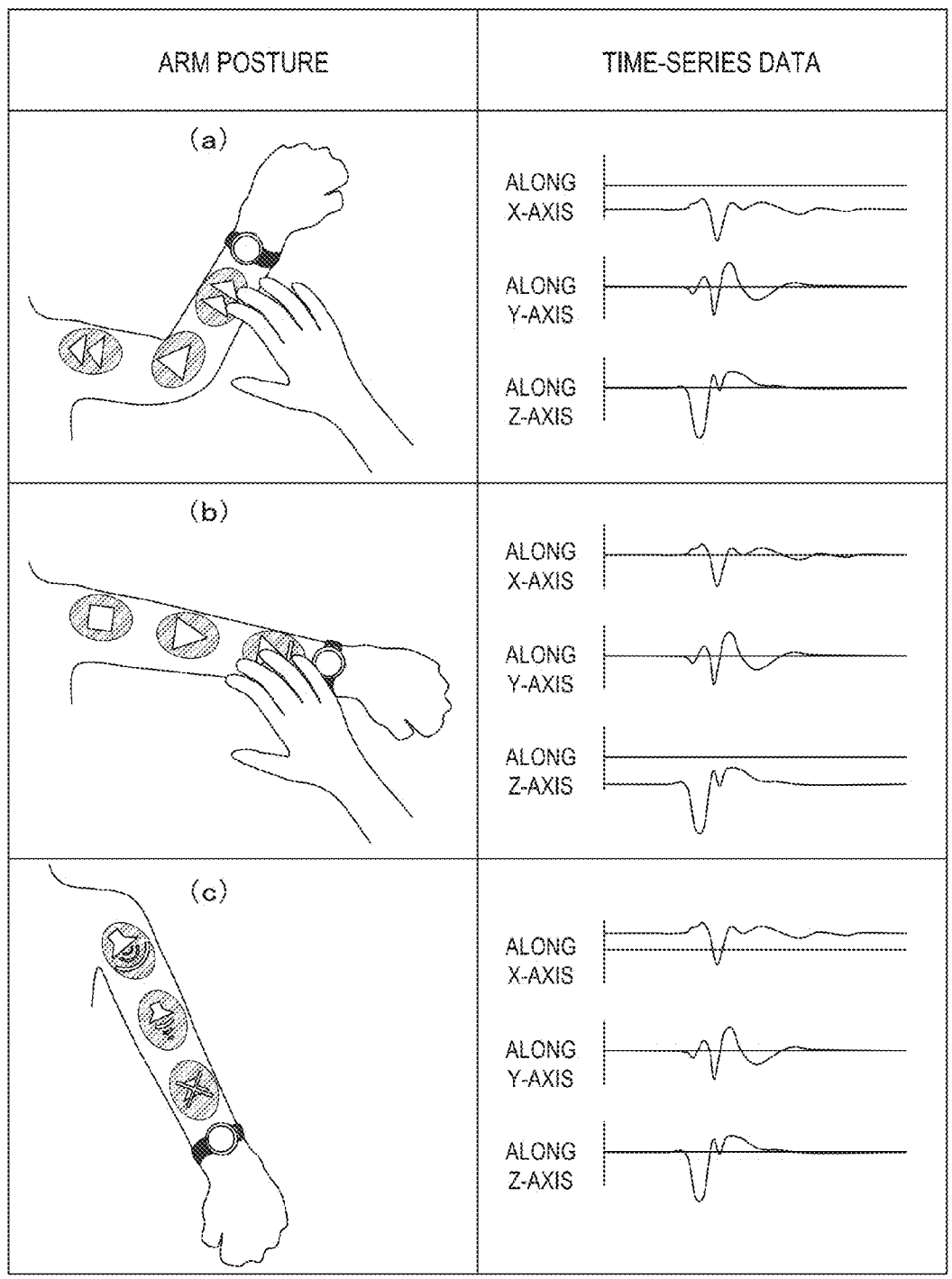
FIG. 20 is a table illustrating arm postures and time-series data corresponding thereto according to the third exemplary embodiment.

FIG. 20 is a table illustrating arm postures and time-series data corresponding thereto. The time-series data in FIG. 20 illustrates various detected waveforms representing the acceleration along the X-, Y-, and Z-axes. Each of the time-series data represents an arm movement detected by the acceleration sensor 9 of the contact detection unit 2 when an arm is tapped.

Referring to (a) of FIG. 20, when an arm is held up, the first input area 71 is tapped. Before the contact detection unit 2 detects the tap, a certain value is detected as the acceleration along the X-axis. This indicates that the acceleration sensor 9 is constantly detecting certain gravitational acceleration. Namely, the acceleration before a tap is inputted indicates gravitational acceleration. The input information determination unit 25 determines an arm posture based on the value of this gravitational acceleration.

Referring to (a) of FIG. 20, since the absolute value of gravitational acceleration in the X direction is larger than those in the Y and Z directions (No in step S601 in FIG. 19) and the acceleration in the X direction is negative (No in step S602 in FIG. 19), the input information determination unit 25 determines that the arm is held up.

In the present exemplary embodiment, an allocated operation command is changed depending on a combination of a tap position and an arm posture. However, an allocated operation command may be changed depending on a combination of a tap position and change of an arm posture.

In addition, in the present exemplary embodiment, the acceleration sensor 9 is used to detect an arm posture and gravitational acceleration is used to determine an arm posture, to determine an operation command allocated to the input area. However, an arm posture may be determined by combining another sensor such as an angle sensor or a gyroscope.

As in the present exemplary embodiment, by arranging the acceleration sensor 9 in the contact detection unit 2, a tap position can be calculated based on a vibration period, which represents a change amount from a steady state. In addition, by using gravitational acceleration, an arm posture can also be calculated. Thus, the input device according to the present exemplary embodiment can acquire a plurality of state quantities, without requiring an additional sensor. Namely, the device can be configured easily.

Modifications and adjustments of the exemplary embodiment are possible within the scope of the overall disclosure (including the claims) of the present invention and based on the basic technical concept of the present invention. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept.

While some or all of the above exemplary embodiments can be described as the following notes, the present invention is not limited thereto.

(Note 1)
An input device, comprising:
a detection unit that detects a body movement generated by tapping a user body as detection data; and
an input information determination unit that refers to the detection data and determines a tap position based on a fact that the detection data varies depending on the tap position.

(Note 2)
The input device according to note 1, wherein
the input information determination unit determines a tap position by classifying a feature of a waveform of the detection data by pattern matching.

(Note 3)
The input device according to note 2, wherein
the pattern matching is matching (DP matching) based on dynamic programming.

(Note 4)
The input device according to any notes 1 to 3, further comprising:
a storage unit that stores typical data about a body movement caused by tapping and the tap position correlated with the typical data, as template data, wherein
the input information determination unit determines a tap position by calculating a correlation between the typical data stored in the storage unit and the detection data.

(Note 5)
The input device according to note 1, wherein
the input information determination unit determines a tap position by classifying a feature of a waveform of the detection data by a rule.

(Note 6)
The input device according to note 5, wherein
the rule is based on an articulated structure model.

(Note 7)
The input device according to any notes 1 to 6, wherein
the body movement is an arm movement.

(Note 8)
The input device according to any notes 1 to 7, wherein
the input information determination unit outputs an operation command associated with the determined tap position.

(Note 9)
The input device according to any notes 1 to 8;
wherein the detection unit comprises an acceleration sensor detecting vibration.

(Note 10)
The input device according to any notes 7 to 9, wherein
the detection unit is arranged on a wrist.

(Note 11)
An input method, comprising:
by a computer, detecting a body movement generated by tapping a user body as detection data; and referring to the detection data and determining a tap position based on a fact that the detection data varies depending on the tap position.

(Note 12)
The input method according to note 11, wherein
the computer determines a tap position by classifying a feature of a waveform of the detection data by pattern matching.

(Note 13)
The input method according to note 12, wherein
the pattern matching is matching (DP matching) based on dynamic programming.

(Note 14)
The input method according to any one of notes 11 to 13, wherein
the computer determines a tap position, by referring to a storage unit that stores typical data about a body movement caused by tapping and the tap position correlated with the typical data as template data and by calculating a correlation between the typical data stored in the storage unit and the detection data.

(Note 15)
The input method according to note 11, wherein
the computer determines a tap position by classifying a feature of a waveform of the detection data by a rule.

(Note 16)
The input method according to note 15, wherein
the rule is based on an articulated structure model.

(Note 17)
The input method according to any one of notes 11 to 16, wherein
the body movement is an arm movement.

(Note 18)
The input method according to any one of notes 11 to 17, further comprising:
by the computer, outputting an operation command associated with the determined tap position.

(Note 19)
A program, causing a computer to execute:
detecting a body movement generated by tapping a user body as detection data; and
referring to the detection data and determining a tap position based on a fact that the detection data varies depending on the tap position.

(Note 20)
The program according to note 19, causing the computer to execute:
determining a tap position by classifying a feature of a waveform of the detection data by pattern matching.

(Note 21)
The program according to note 20, wherein
the pattern matching is matching (DP matching) based on dynamic programming.

(Note 22)
The program according to any one of notes 19 to 21, causing the computer to execute:
determining a tap position, by referring to a storage unit that stores typical data about a body movement caused by tapping and the tap position correlated with the typical data as template data and by calculating a correlation between the typical data stored in the storage unit and the detection data.

(Note 23)
The program according to note 19, causing the computer to execute:
determining a tap position by classifying a feature of a waveform of the detection data by a rule.

(Note 24)
The program according to note 23, wherein
the rule is based on an articulated structure model.

(Note 25)
The program according to any one of notes 19 to 24, wherein
the body movement is an arm movement.

(Note 26)
The program according to any one of notes 19 to 25, causing the computer to execute:
outputting an operation command associated with the determined tap position.

(Note 27)
A computer-readable storage medium storing the program according to any one of notes 19 to 26.

(Note 28)
An input device, comprising:
a detection unit that detects a body movement generated by tapping a user body as detection data; and
an input information determination unit that refers to the detection data, determines a tap position based on a fact that the detection data varies depending on the tap position, and outputs an operation command associated with the determined tap position.

(Note 29)
An input method, comprising:
by a computer, detecting a body movement generated by tapping a user body as detection data;
referring to the detection data and determining a tap position based on a fact that the detection data varies depending on the tap position; and
outputting an operation command associated with the determined tap position.

(Note 30)
A program, causing a computer to execute:
detecting a body movement generated by tapping a user body as detection data;
referring to the detection data and determining a tap position based on a fact that the detection data varies depending on the tap position; and
outputting an operation command associated with the determined tap position.

(Note 31)
The input device according to note 5 or 6, wherein
the detection unit comprises an acceleration sensor, and
the input information determination unit determines an arm posture on the tapped side based on a gravitational acceleration detected by the acceleration sensor and outputs an operation command associated with a combination of the determined tap position and arm posture.

(Note 32)
The input device according to note 31, wherein
the detection unit is arranged on a wrist on the tapped side.

(Note 33)
The input device according to note 31 or 32, wherein
the input information determination unit determines, based on the gravitational acceleration, whether the arm posture on the tapped side indicates an arm held up, an arm held horizontally, or an arm held down.

REFERENCE SIGNS LIST 1 detection unit
2 contact detection unit
4 storage unit
5, 15, 25 input information determination unit
6 information presentation unit
7 information presentation unit
9 acceleration sensor 10 wiring board
11 calculation processing unit
12 presentation content processing unit
13 presentation unit
14 housing
16 memory
71 to 73 input area
a, p detection data
c template data
d, b input information determination data
e, g rule-based data

What is claimed is:

1. An input device, comprising: a detection unit, disposed on a tapped side of a user body, that comprises an acceleration sensor and produces detection data by detecting a movement on the tapped side of the user body using the acceleration sensor,
    wherein the movement on the tapped side of the user body is generated by tapping a position on the tapped side of the user body with a position on a tapping side of the user body, the detection unit being located at a different position from the tapped position;
    an input information determination unit that determines the tapped position based on the detection data, and outputs an operation command associated with the determined tapped position,
    wherein the input information determination unit determines a static arm posture of an arm, on which the tapped position is located based on a gravitational acceleration detected by the acceleration sensor and outputs an operation command associated with a combination of the determined tapped position and the static arm posture, and
    when the static arm posture is the arm held up, the operation command comprises one from among fast forward, play, pause, and rewind,
    when the static arm posture is the arm held horizontally, the operation command comprises one from among next track, play, pause, and stop, and
    when the static arm posture is the arm held down away from a head of the user, the operation command comprises one from among mute, volume down, and volume up.

2. The input device according to claim 1, wherein the input information determination unit determines the tapped position by classifying a feature of a waveform of the detection data by pattern matching.

3. The input device according to claim 2, wherein the pattern matching is matching based on dynamic programming.

4. The input device according to claim 1, further comprising:
    a storage unit that stores predetermined data about the movement caused by tapping and the tapped position correlated with the predetermined data, as template data, wherein
    the input information determination unit determines a tapped position by calculating a correlation between the predetermined data stored in the storage unit and the detection data.

5. The input device according to claim 1, wherein the input information determination unit determines the tapped position by classifying a feature of a waveform of the detection data by a rule.

6. The input device according to claim 5, wherein the rule is based on an articulated structure model.

7. The input device according to claim 1, wherein the movement is an arm movement.

8. An input method, comprising:
    by a computer, producing detection data by detecting a movement on a tapped side of a user body, wherein the movement on the tapped side of the user body is generated by tapping a position on the tapped side of the user body with a position on a tapping side of the user body, the detection being performed at a different position from the tapped position;
    determining the tapped position based on the detection data; and
    determining a static arm posture of an arm, on which the tapped position is located based on a gravitational acceleration detected by an acceleration sensor, and outputting an operation command associated with a combination of the determined tapped position and the static arm posture, and
    when the static arm posture is the arm held up, the operation command comprises one from among fast forward, play, pause, and rewind,
    when the static arm posture is the arm held horizontally, the operation command comprises one from among next track, play, pause, and stop, and
    when the static arm posture is the arm held down away from a head of the user, the operation command comprises one from among mute, volume down, and volume up.

9. The input method according to claim 8, wherein the computer determines the tapped position by classifying a feature of a waveform of the detection data by pattern matching.

10. The input method according to claim 9, wherein the pattern matching is matching based on dynamic programming.

11. The input method according to claim 8, wherein the computer determines the tapped position by referring to a storage unit that stores predetermined data about the movement caused by tapping and the tapped position correlated with the predetermined data as template data and by calculating a correlation between the predetermined data stored in the storage unit and the detection data.

12. The input method according to claim 8, wherein the computer determines a tapped position by classifying a feature of a waveform of the detection data by a rule.

13. The input method according to claim 12, wherein the rule is based on an articulated structure model.

14. A non-transitory computer-readable storage medium, storing a program that causes a computer to execute:
    producing detection data by detecting a movement generated on a tapped side of a user body, wherein the movement on the tapped side of the user body is generated by tapping a position on the tapped side of the user body with a position on a tapping side of the user body, the detection being performed at a different position from the tapped position;
    determining the tapped position based on the detection data; and
    determining a static arm posture of an arm, on which the tapped position is located based on a gravitational acceleration detected by an acceleration sensor, and outputting an operation command associated with a combination of the determined tapped position and the static arm posture, and
    when the static arm posture is the arm held up, the operation command comprises one from among fast forward, play, pause, and rewind, when the static arm posture is the arm held horizontally, the operation command comprises one from among next track, play, pause, and stop, and when the static arm posture is the arm held down away from a head of the user, the operation command comprises one from among mute, volume down, and volume up.

15. The medium according to claim 14, wherein
the program causes the computer to execute:
determining the tapped position by classifying a feature of a waveform of the detection data by pattern matching.

16. The program according to claim 15, wherein
the pattern matching is matching based on dynamic programming.

17. The medium according to claim 14, wherein
the program causes the computer to execute:
determining the tapped position by referring to a storage unit that stores predetermined data about the movement caused by tapping and the tapped position correlated with the predetermined data as template data and by calculating a correlation between the predetermined data stored in the storage unit and the detection data.

18. The medium according to claim 14, wherein
the program causes the computer to execute:
determining the tapped position by classifying a feature of a waveform of the detection data by a rule.

19. The input device according to claim 1,
wherein the input information determination unit determines that the static arm posture is the arm held horizontally when an absolute value of the gravitational acceleration in a direction along the arm is not greater than the absolute value of the gravitational acceleration in other directions, and, otherwise, determines whether the static arm posture is the arm held up or the arm held down based on a sign of the gravitational acceleration in the direction along the arm.

* * * * *